US011310553B2

(12) United States Patent
Singhal et al.

(10) Patent No.: US 11,310,553 B2
(45) Date of Patent: Apr. 19, 2022

(54) CHANGING RESOURCE UTILIZATION ASSOCIATED WITH A MEDIA OBJECT BASED ON AN ENGAGEMENT SCORE

(71) Applicant: Apple Inc., Cupertino, CA (US)

(72) Inventors: Shruti Singhal, San Jose, CA (US); Yasser Saby Hafez Rihan, Redwood City, CA (US); Jonathan Iain Wight, San Mateo, CA (US); Yinxuan Shi Moore, Milpitas, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/234,435

(22) Filed: Apr. 19, 2021

(65) Prior Publication Data

US 2021/0400329 A1    Dec. 23, 2021

Related U.S. Application Data

(60) Provisional application No. 63/041,287, filed on Jun. 19, 2020.

(51) Int. Cl.
*H04N 21/431* (2011.01)
*H04N 21/426* (2011.01)
(Continued)

(52) U.S. Cl.
CPC ... *H04N 21/42653* (2013.01); *H04N 21/4318* (2013.01); *H04N 21/44204* (2013.01);
(Continued)

(58) Field of Classification Search
CPC ......... H04N 21/42653; H04N 21/4318; H04N 21/44204; H04N 21/4621; H04N 21/4667; H04N 21/47205
See application file for complete search history.

(56) References Cited

U.S. PATENT DOCUMENTS

2015/0172742 A1 *  6/2015  Richardson ...... H04N 21/44218
                                                          725/10
2015/0189378 A1 *  7/2015  Soundararajan ... H04N 21/4126
                                                          725/12
(Continued)

FOREIGN PATENT DOCUMENTS

WO    WO-2020172826 A1 *  9/2020  ........... H04N 21/472

*Primary Examiner* — Jefferey F Harold
*Assistant Examiner* — Alexander Boyd
(74) *Attorney, Agent, or Firm* — Fernando & Partners, LLP

(57) ABSTRACT

In accordance with some implementations, a method is performed at an electronic device with one or more processors, a non-transitory memory, and a display. The method includes displaying, on the display, a representation of a first portion of a media object, wherein the first portion of the media object is associated with a first resource utilization value. The first resource utilization value characterizes a utilization of a respective resource by the electronic device. The method includes determining an engagement score that characterizes a level of user engagement with respect to the representation of the first portion of the media object. The method includes changing the utilization of the respective resource from the first resource utilization value to a second resource utilization value based on a function of the engagement score. The second resource utilization value is associated with a second portion of the media object.

24 Claims, 21 Drawing Sheets

(51) Int. Cl.
*H04N 21/472* (2011.01)
*H04N 21/442* (2011.01)
*H04N 21/466* (2011.01)
*H04N 21/462* (2011.01)

(52) U.S. Cl.
CPC ..... *H04N 21/4621* (2013.01); *H04N 21/4667* (2013.01); *H04N 21/47205* (2013.01)

(56) References Cited

U.S. PATENT DOCUMENTS

| | | | |
|---|---|---|---|
| 2016/0366454 A1* | 12/2016 | Tatourian | H04N 21/2393 |
| 2017/0134803 A1* | 5/2017 | Shaw | H04N 21/42203 |
| 2018/0191952 A1* | 7/2018 | Ardo | H04N 21/2662 |
| 2020/0327350 A1* | 10/2020 | Anand | G06K 9/00805 |
| 2021/0112295 A1* | 4/2021 | Birkbeck | H04N 21/812 |
| 2021/0185368 A1* | 6/2021 | Hao | H04N 21/251 |

* cited by examiner

CHANGING RESOURCE UTILIZATION ASSOCIATED WITH A MEDIA OBJECT BASED ON AN ENGAGEMENT SCORE

CROSS-REFERENCE TO RELATED APPLICATION

This application claims priority to U.S. Provisional Patent App. No. 63/041,287, filed on Jun. 19, 2020, which is hereby incorporated by reference in its entirety.

TECHNICAL FIELD

The present disclosure relates to presenting a media object, and, in particular, changing device resource utilization associated with presenting the media object.

BACKGROUND

In various circumstances, a device presents a media object, such as displaying a video stream or an avatar associated with a copresence session. In order to display the media object, the device obtains the media object and renders the media object in order to generate corresponding display data for display. Obtaining and rendering the media object utilizes a combination of communication link, processing, and memory resources of the device.

Moreover, user engagement with respect to a media object is a function of various characteristics, such a level of user focus or a location of the media object within a field-of-view of a display. However, the device does not change resource utilization associated with the media object, based on a function of the level of user engagement. Accordingly, the device utilizes excessive resources.

SUMMARY

In accordance with some implementations, a method is performed at an electronic device with one or more processors, a non-transitory memory, and a display. The method includes displaying, on the display, a representation of a first portion of a media object, wherein the first portion of the media object is associated with a first resource utilization value. The first resource utilization value characterizes a utilization of a respective resource by the electronic device. The method includes determining an engagement score that characterizes a level of user engagement with respect to the representation of the first portion of the media object. The method includes changing the utilization of the respective resource from the first resource utilization value to a second resource utilization value based on a function of the engagement score. The second resource utilization value is associated with a second portion of the media object.

In accordance with some implementations, an electronic device includes one or more processors, a non-transitory memory, and a display. One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

SUMMARY

Figure 1:
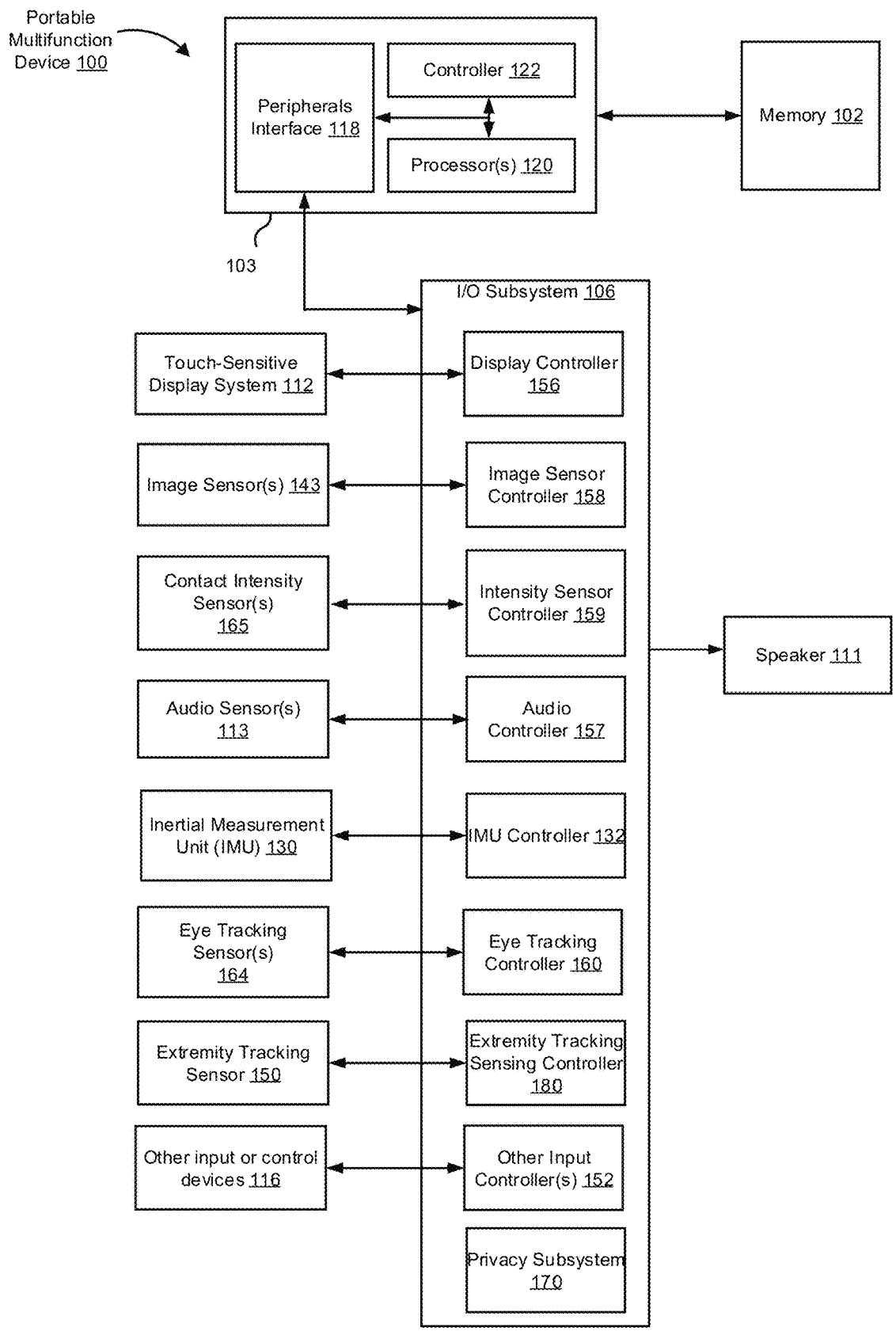
FIG. 1 is a block diagram of an example of a portable multifunction device in accordance with some implementations.

In various circumstances, a device presents a media object. For example, the device displays a three-dimensional (3D) representation of an object or a video stream. As another example, the device plays audio content via an integrated speaker. In order to present a media object, the device initially obtains the media object. For example, the device may obtain the media object, via a communication link, from local storage or from a separate content delivery server. In order to display a particular media object, the device also renders the particular media object in order to generate corresponding display data for display. Obtaining and rendering a media object utilizes a combination of communication link, processing, and memory resources of the device. Moreover, user engagement with respect to a media object may be a function of various characteristics. For example, a level of focus (e.g., eye gaze of a user) with respect to the media object may vary over time. As another example, in response to a positional change of the device (e.g., a user wearing a head-mountable device (HMD) turns head), the device moves the media object to a different location on the display or ceases to display the media object entirely. However, the device does not change resource utilization associated with the media object based on a function of the level of user engagement. Thus, the device does not, for example, reduce resource utilization in response to a reduction in the level of user engagement. Accordingly, the device utilizes excessive resources in connection with presenting the media object.

By contrast, various implementations disclosed herein include methods, electronic devices, and systems for changing a utilization of a respective resource, by an electronic device, based on a function of an engagement score that is associated with a media object. For example, the media object corresponds to an entire episode of a television show or an entire sequence of a moving three-dimensional (3D) representation of an insect. The engagement score characterizes a level of user engagement with respect to a displayed representation of a first portion of the media object. In some implementations, the engagement score is a function of eye tracking data that is indicative of a gaze of a user. In some implementations, the engagement score is a function of where the representation of the first portion of the media object is located on the display. For example, based on a positional change input that changes the position of the electronic device, the electronic device ceases to display the representation of the first portion of the media object. Accordingly, the electronic device may set the engagement score to a nominal value. Based on the nominal value, the electronic device reduces the resource utilization associated with a second portion of the media object because the second portion of the media object is not within the field-of-view of the display and is thus not viewable by the user. By changing the utilization of the respective resource based on the engagement score, the electronic device reduces resource utilization, as compared with other devices.

In some implementations, the respective resource may include a combination of a rendering resource associated with rendering the media object, and a communication link resource associated with obtaining the media object. For example, in response to determining a reduction of the engagement score, the electronic device instructs a content delivery server to provide the second portion of the media object at an output rate that is lower than an output rate at which the content delivery server provided the first portion of the media object. As another example, in response to determining an increase of the engagement score, the electronic device increases the utilization of a graphics processing unit (GPU) resource in order to render the second portion of the media object at a higher resolution (e.g., more information), as compared with rendering the first portion of the media object.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a touch-sensitive display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the touch-sensitive display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to an operating environment. In some implementations, the other input or control devices 116 include a depth sensor and/or a time of flight sensor that obtains depth information characterizing an operating environment.

The touch-sensitive display system 112 provides an input interface and an output interface between the electronic device 100 and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system 112 has a touch-sensitive surface, sensor, or set of sensors that accepts input from the user based on haptic and/or tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example implementation, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other implementations. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112.

The user optionally makes contact with the touch-sensitive display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within an operating environment. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye tracking data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

FIGS. 2A-2K are an example of changing resource utilization associated with a media object based on an engagement score in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

Figure 2A:
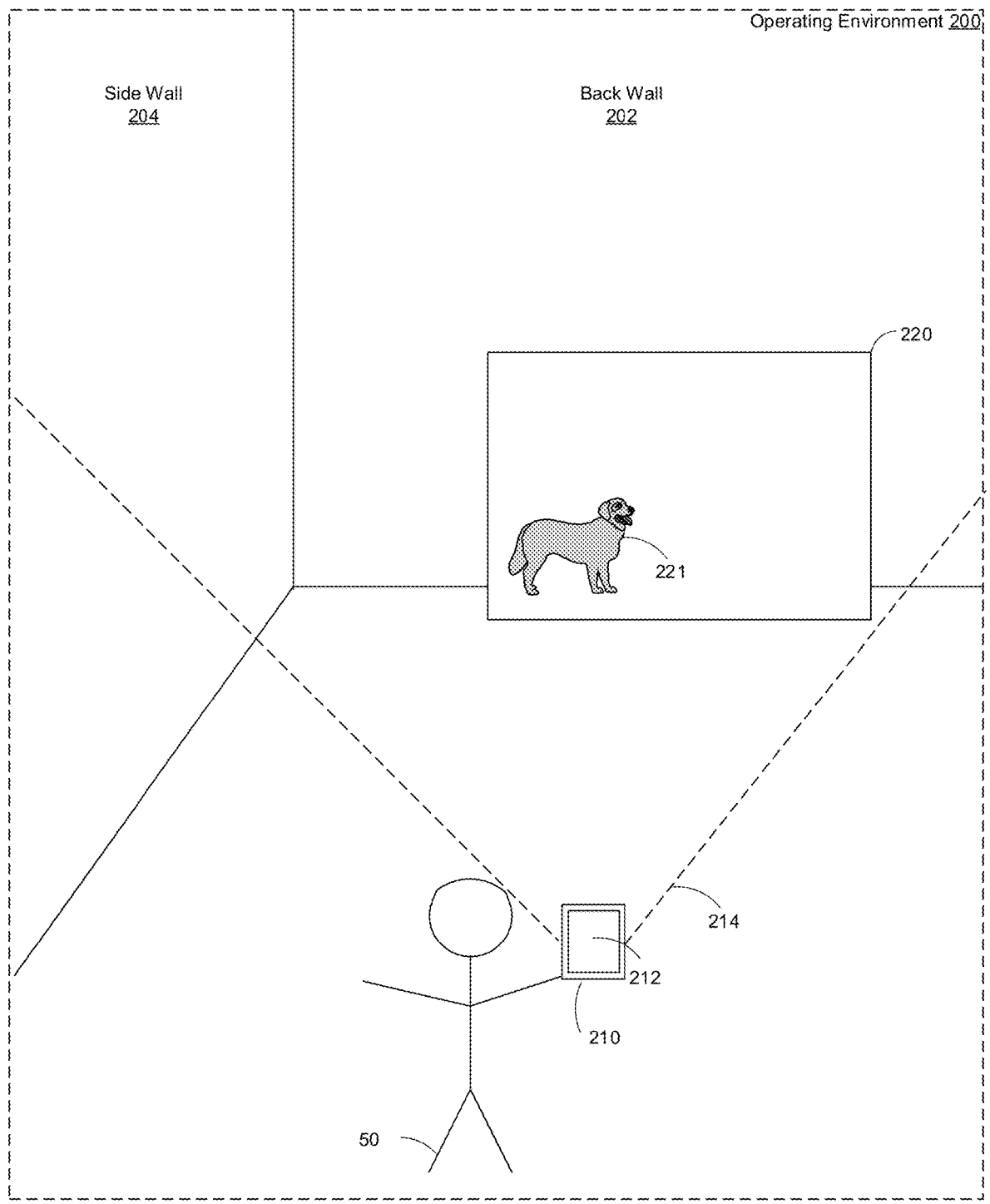
FIGS. 2A-2K are an example of changing resource utilization associated with a media object based on an engagement score in accordance with some implementations.

As illustrated in FIG. 2A, an electronic device 210 is associated with an operating environment 200. For example, in some implementations, the operating environment 200 includes a combination of computer-generated objects and physical objects, such as an augmented reality (AR) or a mixed reality (MR) environment. As another example, in some implementations, the operating environment 200 includes a physical side wall 204 and a physical back wall 202, and the electronic device 210 displays, via a display 212, a computer-generated display screen 220. In some implementations, the operating environment 200 is a virtual reality (VR) environment in which the entirety of the operating environment 200 is comprised of computer-generated elements.

The electronic device 210 is being held by a user 50. In some implementations, the electronic device 210 corresponds to a mobile device, such as a smartphone, laptop, tablet, etc. In some implementations, the electronic device 210 is similar to and adapted from the electronic device 100 in FIG. 1.

In some implementations, the electronic device 210 corresponds to a head-mountable device (HMD) that includes an integrated display (e.g., a built-in display) that displays a representation of the operating environment 200. In some implementations, the electronic device 210 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 210). For example, in some implementations, the electronic device 210 slides/ snaps into or otherwise attaches to the head-mountable enclosure. In some implementations, the display of the device attached to the head-mountable enclosure presents (e.g., displays) the representation of the operating environment 200. For example, in some implementations, the electronic device 210 corresponds to a mobile phone that can be attached to the head-mountable enclosure. In various implementations, examples of the electronic device 210 include smartphones, tablets, media players, laptops, etc.

The electronic device 210 includes a display 212. The display 212 is associated with a field-of-view 214 including a portion the operating environment 200. The portion the operating environment 200 includes a display screen 220 and a video stream within the display screen 220. The video stream represents a media object, including a dog 221. For example, in some implementations, the electronic device 210 obtains the media object, and renders the media object in order to generate the video stream for display on the display 212.

In some implementations, the display screen 220 corresponds to a virtual display screen (e.g., a computer-generated television) displayed by the display 212, and the electronic device 210 displays the video stream within the virtual display screen. In some implementations, the display screen 220 corresponds to a physical display screen (e.g., a real-world television), and the electronic device 210 displays the video stream within the physical display screen. To that end, in some implementations, the electronic device 210 performs semantic segmentation with respect to the operating environment 200 in order to semantically identify, for example, a "television" or a "viewing area." One of ordinary skill in the art will appreciate that, in some implementations, the electronic device 210 displays the video stream without displaying a virtual display screen, or displays the video stream independent of a position of a physical display screen within the operating environment 200.

Figure 2B:
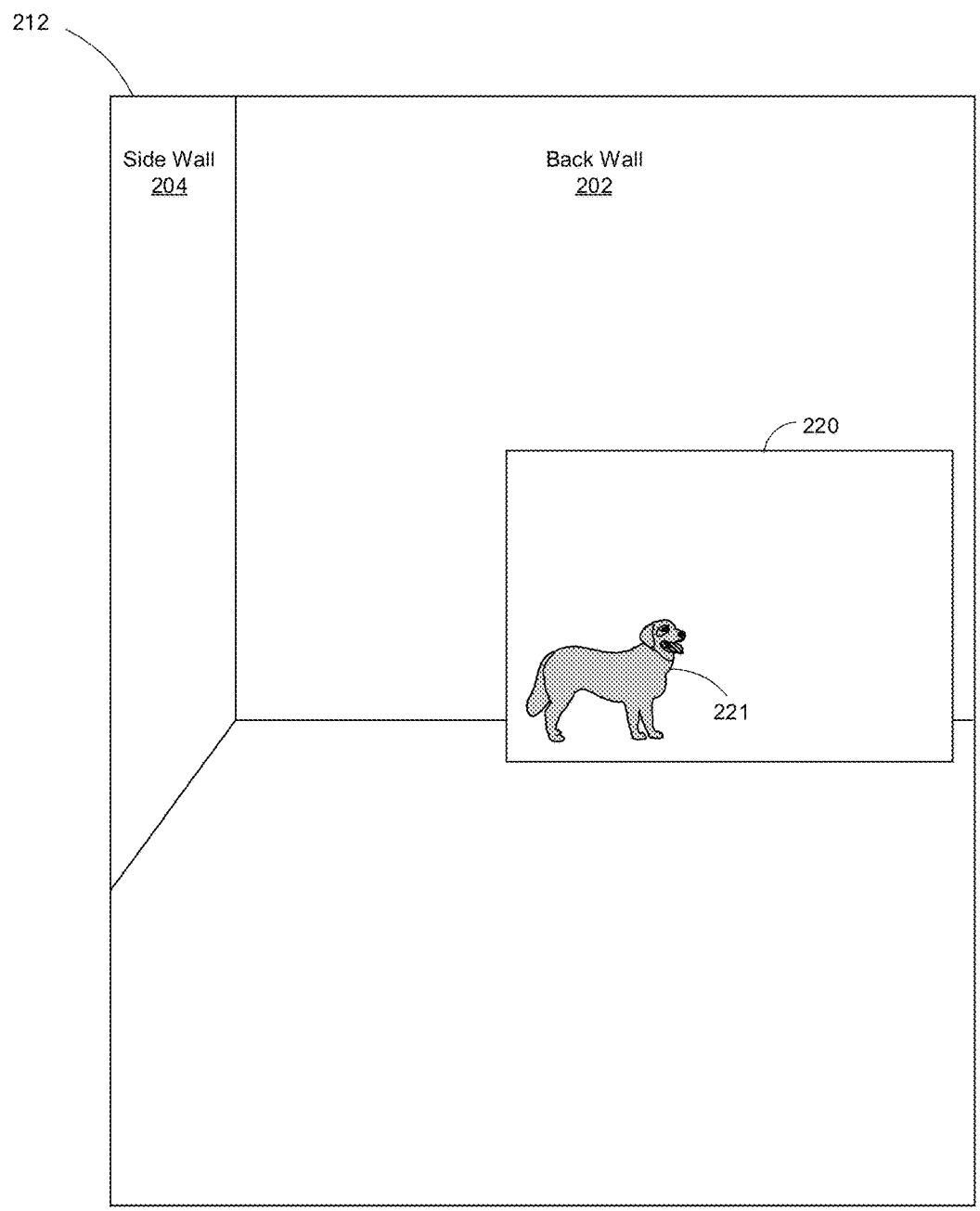

As illustrated in FIG. 2B, the display 212 displays a first portion of the video stream within the display screen 220. The first portion of the video stream represents a first portion of the media object. The first portion of the video stream is characterized by a relatively high resolution value, such as a 4K video stream of the dog 221. Accordingly, the first portion of the media object is associated with a relatively high, first resource utilization value. The first resource utilization value characterizes a utilization of a respective resource by the electronic device 210.

For example, in some implementations, the first resource utilization value characterizes the electronic device 210 utilizing a relatively high level of a communication link resource in order to obtain the first portion of the media object. For example, the electronic device 210 utilizes the communication link resource in order to satisfy a performance metric with respect to a quality of service (QoS) metric (e.g., bandwidth, packet loss, jitter, etc.) associated with obtaining the first portion of the media object.

As another example, in some implementations, the first resource utilization value characterizes the electronic device 210 utilizing a relatively high level of a rendering resource associated with rendering the first portion of the video stream. For example, the electronic device 210 renders the first portion of the media object in order to generate a relatively high resolution (e.g., 4K) representation of the first portion of the video stream. In some implementations, the first resource utilization value characterizes the utilization of a combination of the communication link resource, the rendering resource, and other device resources associated with displaying a representation of the media object.

Figure 2C:
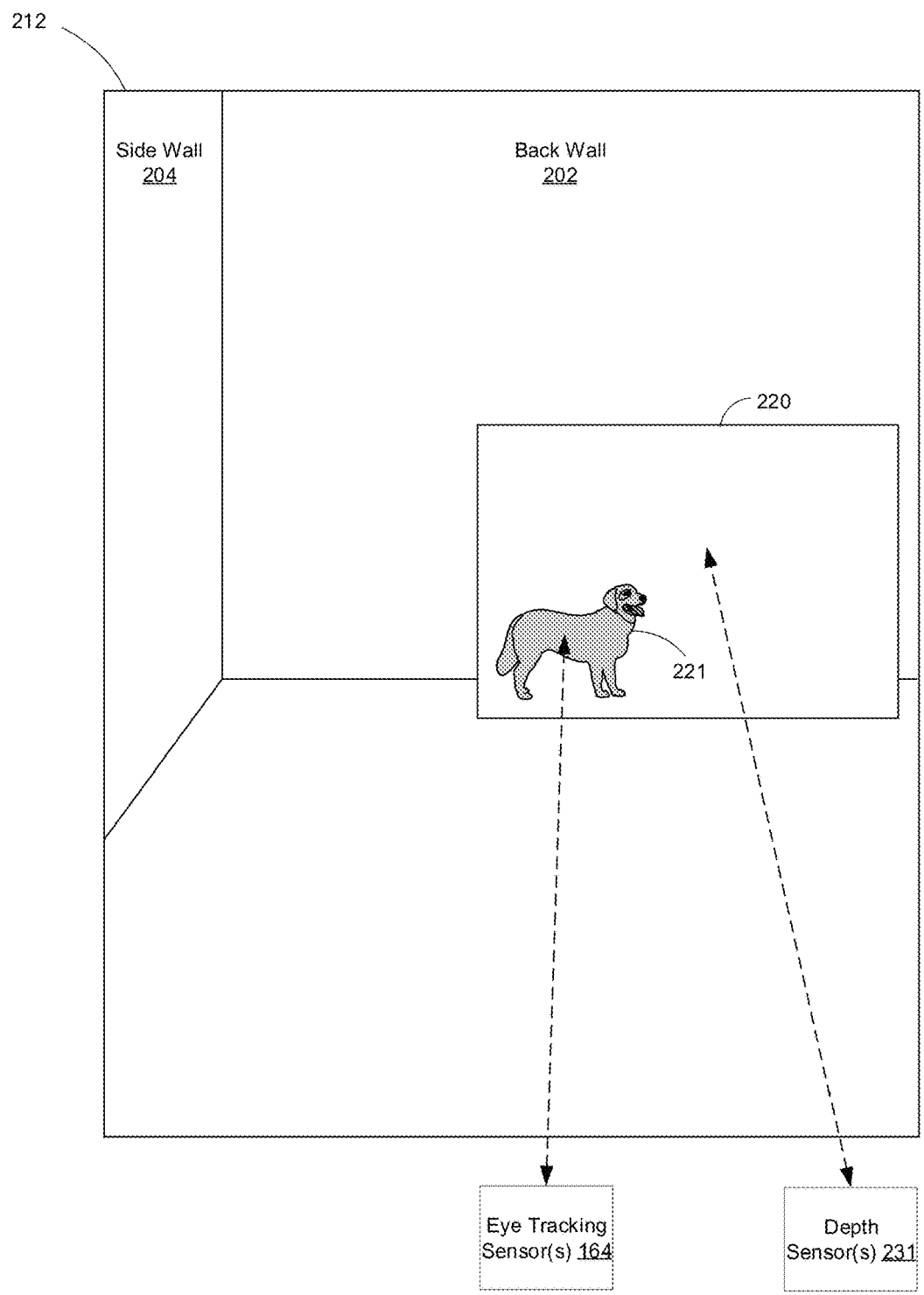

In contrast to previously available devices, the electronic device 210 maintains or changes the utilization of the respective resource based on an engagement score 232. The engagement score 232 characterizes a level of user engagement with respect to a representation of the media stream, such as the displayed video stream representing the dog 221. Accordingly, as compared with the previously available devices, in some circumstances the electronic device 210 reduces resource utilization without degrading the experience of the user 50. To that end, in some implementations, as illustrated in FIG. 2C, the electronic device 210 includes and utilizes one or more eye tracking sensor(s) 164 and one or more depth sensor(s) 231 in order to determine the engagement score 232. The eye tracking sensor(s) 164 output eye tracking data associated with the user 50, and the electronic device 210 determines that an eye gaze of the user 50 is directed to the dog 221. Moreover, the depth sensor(s) 231 output depth data characterizing the operating environment 200, and the electronic device 210 determines a first depth value characterizing a distance between the display 212 and the display screen 220 (e.g., the center of the display screen 220). One of ordinary skill in the art will appreciate that, in some implementations, the electronic device 210 determines the engagement score 232 based on other sensor data.

Figure 2D:
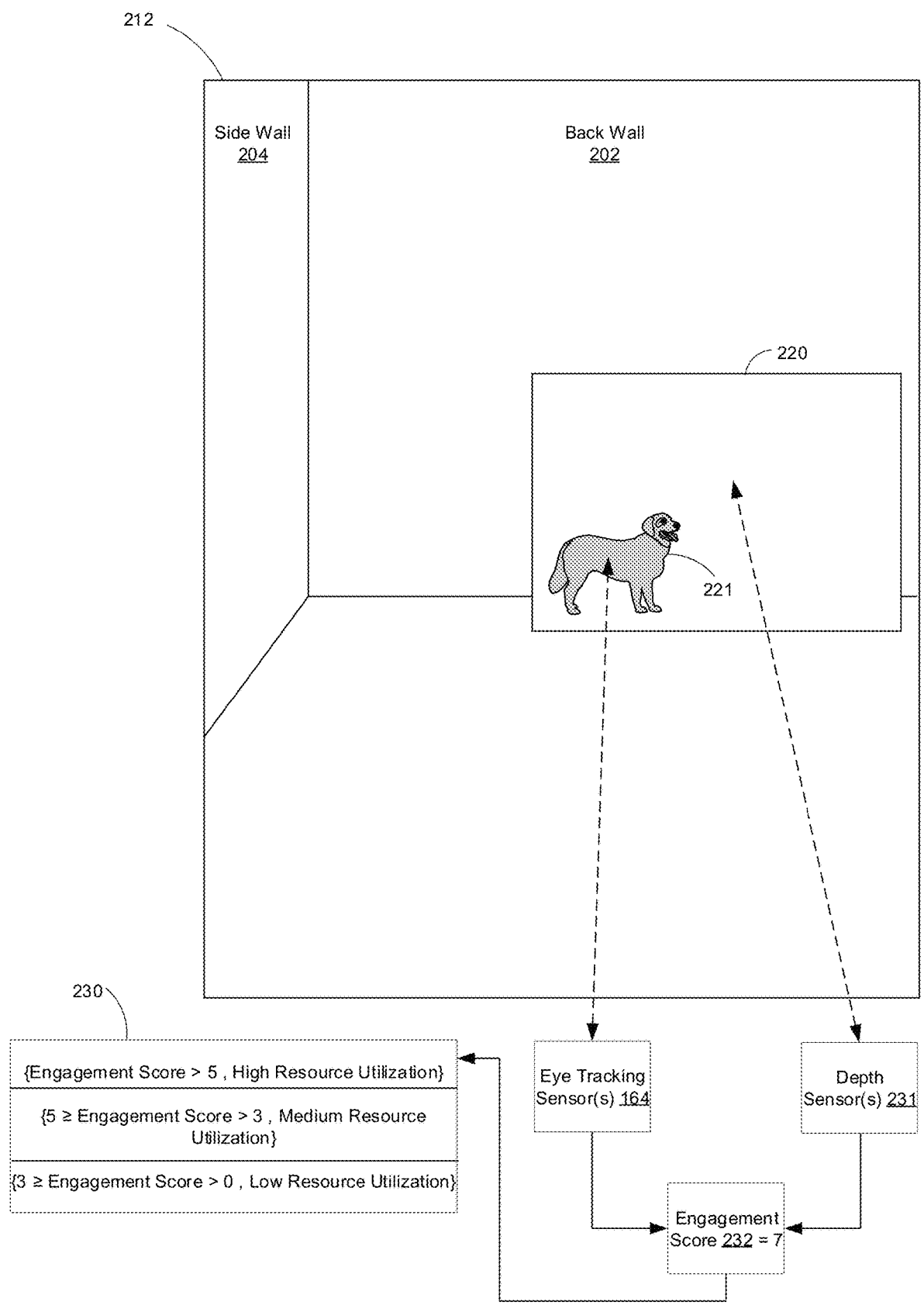

As illustrated in FIG. 2D, the electronic device 210 determines the engagement score 232 having a value of '7' based on the eye tracking data and the depth data. With reference to the example illustrated in FIGS. 2A-2K, the engagement score 232 ranges from '0' (e.g., not engaged at all) to '10' (highest level of engagement). However, one of ordinary skill in the art will appreciate that other implementations include a different range and/or scale for the engagement score 232. Referring back to FIG. 2D, the electronic device 210 determines a relatively high engagement score 232 of '7' because the eye gaze of the user 50 is directed to the dog 221.

Figure 2E:
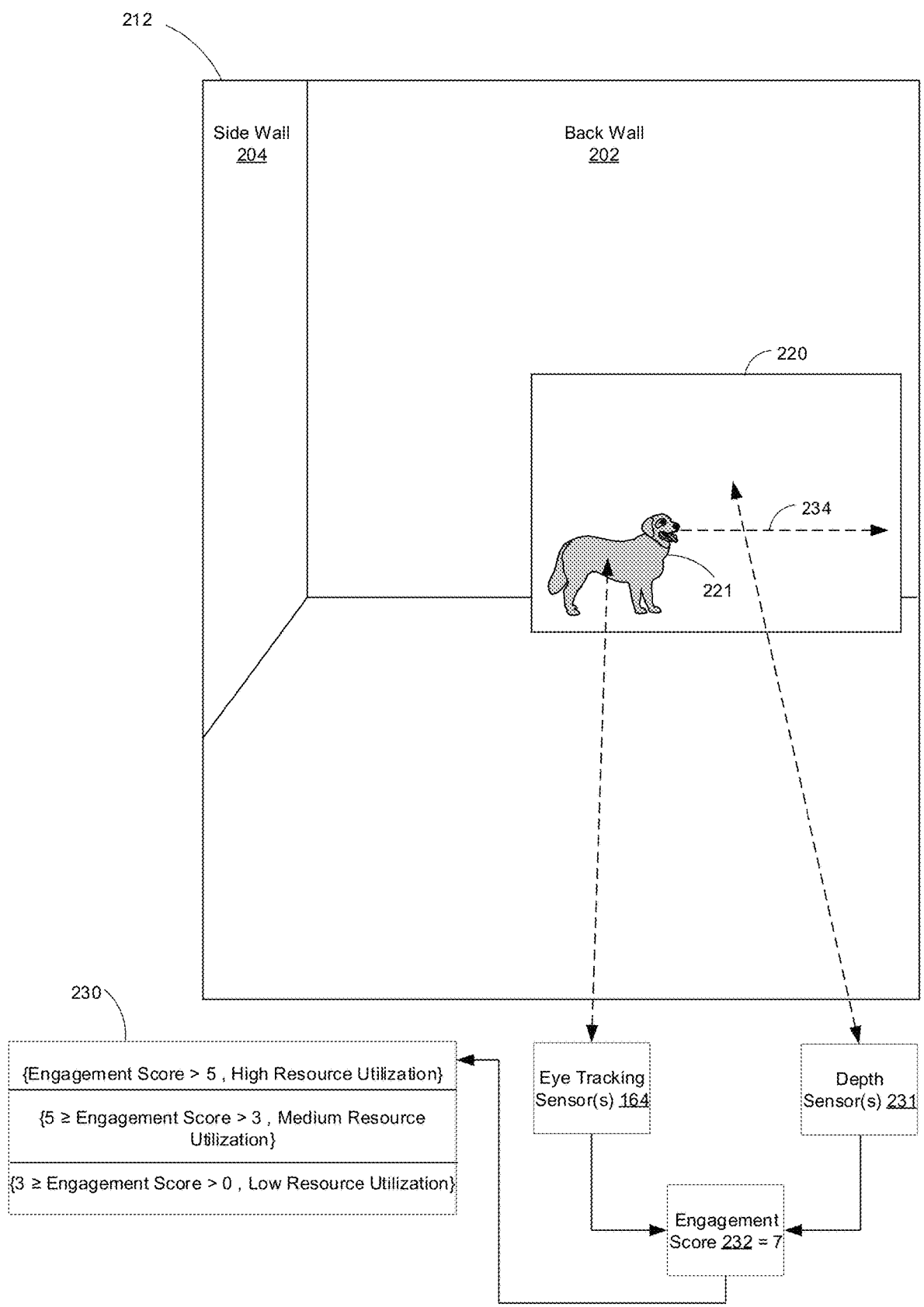

As further illustrated in FIG. 2D, the electronic device 210 selects a high resource utilization based on a resource mapping table 230, which may be locally stored. The resource mapping table 230 provides a mapping between engagement scores and resource utilization levels. Namely, because the engagement score is above '5,' the electronic device 210 selects the high resource utilization, as illustrated in FIG. 2D. Accordingly, the electronic device 210 maintains the relatively high, first resource utilization value associated with obtaining and/or rendering the first portion of the media object. Thus, as illustrated in FIGS. 2D and 2E, the display 212 maintains display of the dog 221 with the relatively high resolution value. As illustrated in FIG. 2E, the dog 221 begins moving across the display screen 220, as is indicated by movement line 234. The movement line 234 is illustrated for purely explanatory purposes. Movement of the dog 221 from the left side of the display screen 220 to the right side of the display screen 220 is illustrated in FIGS. 2F-2K.

Figure 2F:
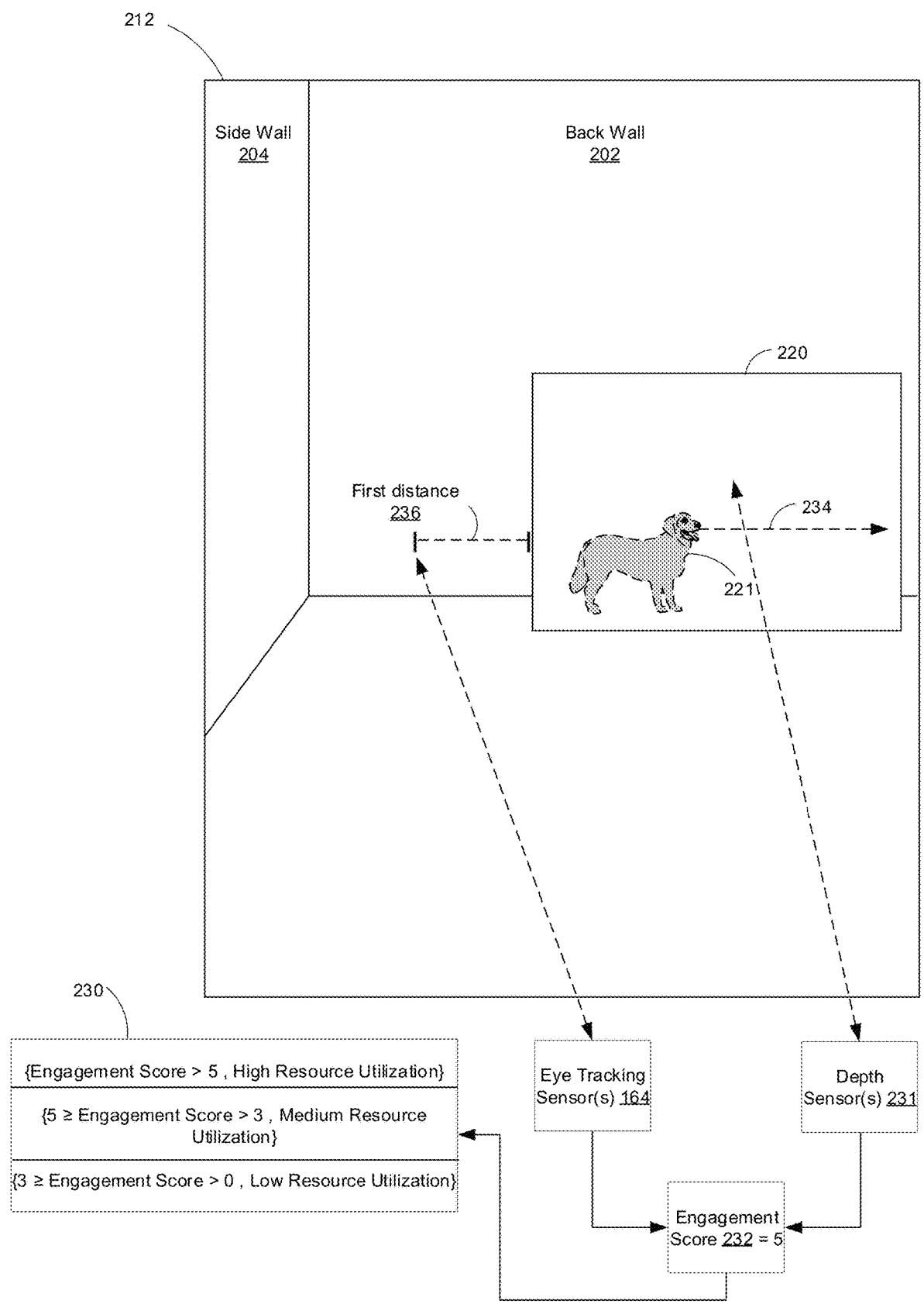

As illustrated in FIG. 2F, based on the eye tracking data, the electronic device 210 determines that the eye gaze of the user 50 has moved a first distance 236 away from the display screen 220. The first distance 236 is illustrated for purely explanatory purposes. Moreover, the electronic device 210 determines, based on the depth data, that the distance between the display 212 and the display screen 220 remains at the first depth value. Accordingly, because the eye gaze of the user 50 is no longer focused on the display screen 220 or on the dog 221, the electronic device 210 reduces the engagement score from '7' to '5,' as illustrated in FIG. 2F. Based on determining the engagement score of '5' and based on the resource mapping table 230, the electronic device 210 change the utilization of the respective resource from the high resource utilization to a medium resource utilization. Accordingly, as illustrated in FIG. 2F, the electronic device 210 displays, on the display 212, a second portion of the video stream with a medium resolution value (e.g., 1080p). Namely, the dog 221 in FIG. 2F is illustrated with long dotted lines in order to indicate a decrease in resolution as compared with the solid line dog 221 illustrated in FIG. 2E. The second portion of the video stream is associated with a second portion of the media object that is associated with the medium resource utilization. To that end, in some implementations, the electronic device 210 obtains the second portion of the media object according to a lower utilization of the communication link resource (e.g., lower bandwidth) as compared with obtaining the first portion of the media object. In some implementations, the electronic device 210 renders the second portion of the media object according to a lower utilization of the rendering resource (e.g., lower GPU processing rate) as compared with rendering the first portion of the media object.

Figure 2G:
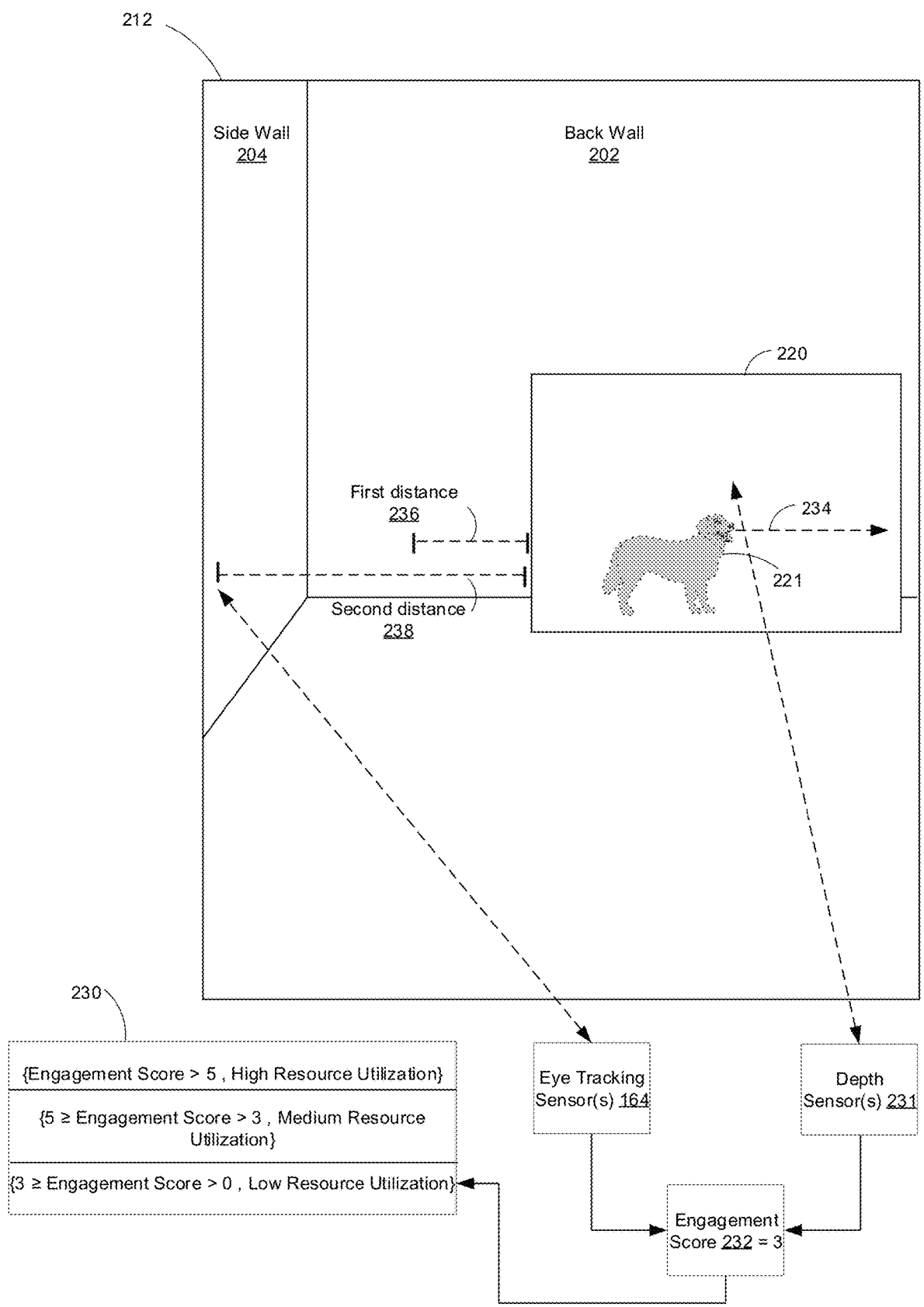

As illustrated in FIG. 2G, based on the eye tracking data, the electronic device 210 determines that the eye gaze of the user 50 has moved a second distance 238 away from the display screen 220. The second distance 238 is illustrated for purely explanatory purposes. On the other hand, the electronic device 210 determines, based on the depth data, that the distance between the display 212 and the display screen 220 remains at the first depth value. The second distance 238 is larger than the first distance 236. Accordingly, the electronic device 210 further reduces the engagement score from '5' to '3.' Based on determining the engagement score of '3' and based on the resource mapping table 230, the electronic device 210 changes the utilization of the respective resource from the medium resource utilization to a low resource utilization. Accordingly, the electronic device 210 displays, on the display 212, a third portion of the video stream with a low resolution value (e.g., 480p). Namely, the dog 221 in FIG. 2G is illustrated with short dotted lines in order to indicate a decrease in resolution as compared with the long dotted line dog 221 illustrated in FIG. 2F. The third portion of the video stream is associated with a third portion of the media object that is associated with the low resource utilization. To that end, in some implementations, the electronic device 210 obtains the third portion of the media object according to a lower utilization of the communication link resource (e.g., lower bandwidth) as compared with obtaining the second portion of the media object. In some implementations, the electronic device 210 renders the third portion of the media object according to a lower utilization of the rendering resource (e.g., lower GPU processing rate) as compared with rendering the second portion of the media object.

Figure 2H:
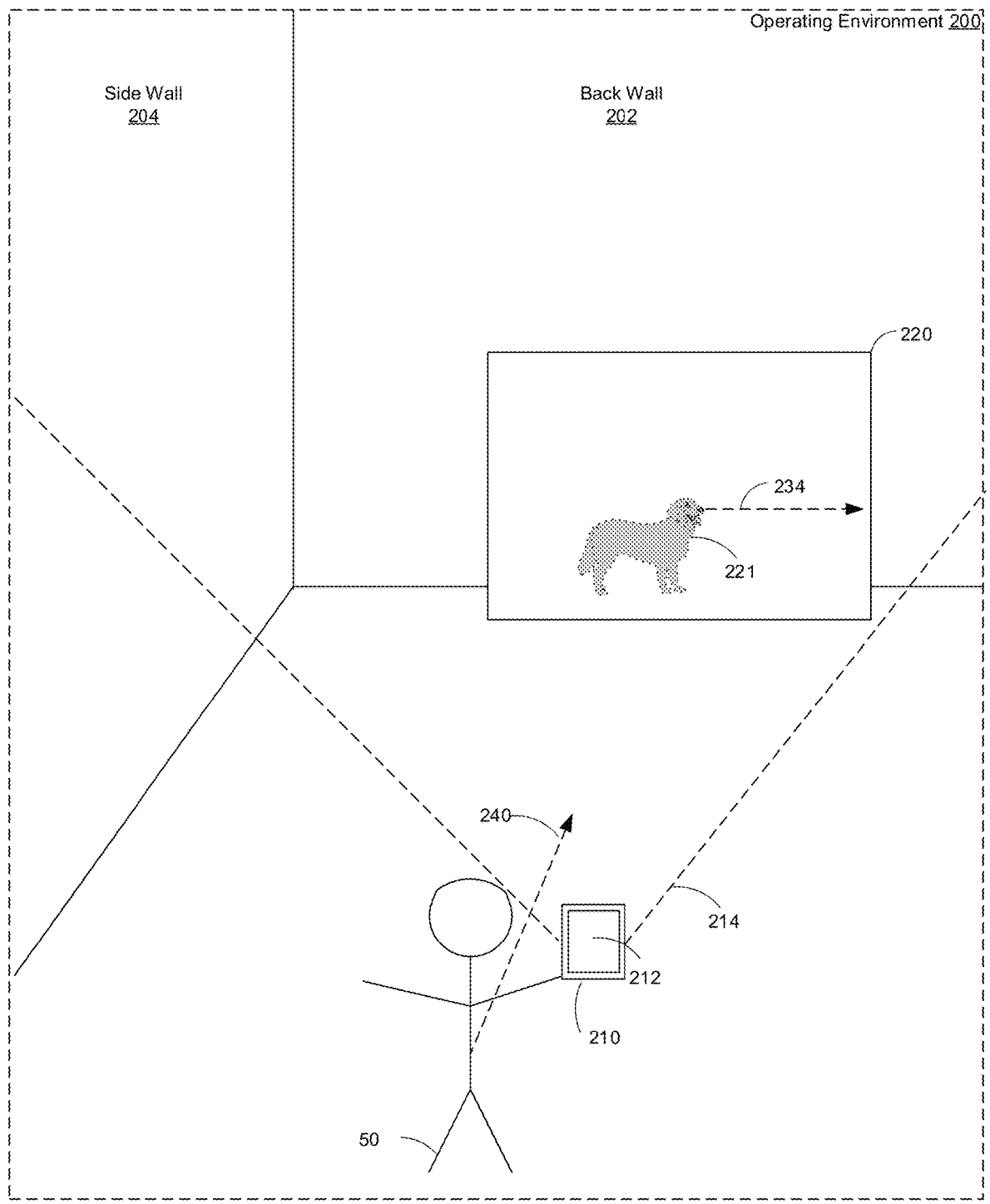
Figure 2I:
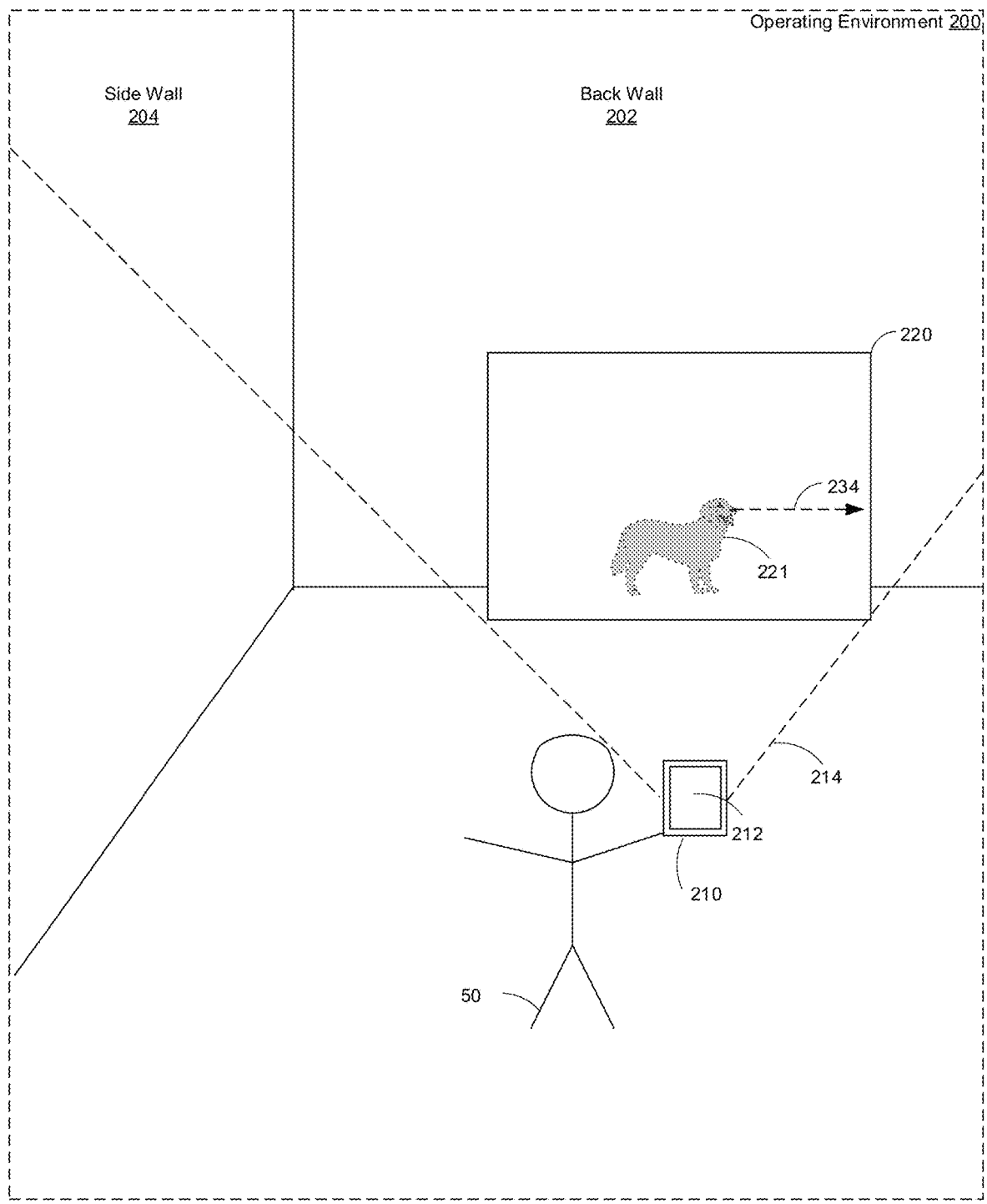
Figure 2J:
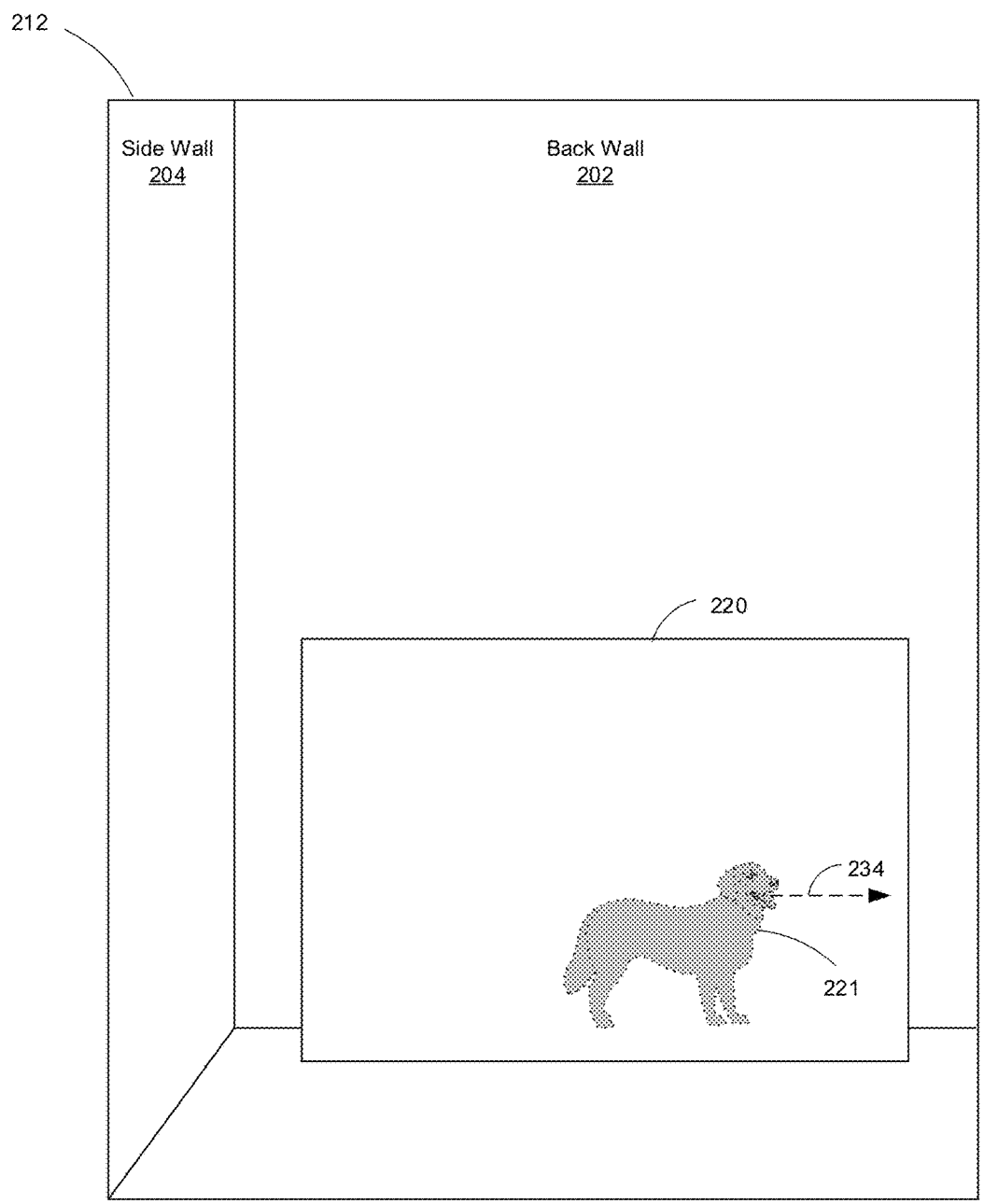

As illustrated in FIGS. 2H and 2I, the user 50 and thus the electronic device 210 move closer to the back wall 202, as indicated by device movement line 240. The device movement line 240 is illustrated for purely explanatory purposes. Accordingly, as illustrated in FIG. 2J, the display 212 displays a larger display screen 220 and video stream, as compared with FIG. 2G.

Figure 2K:
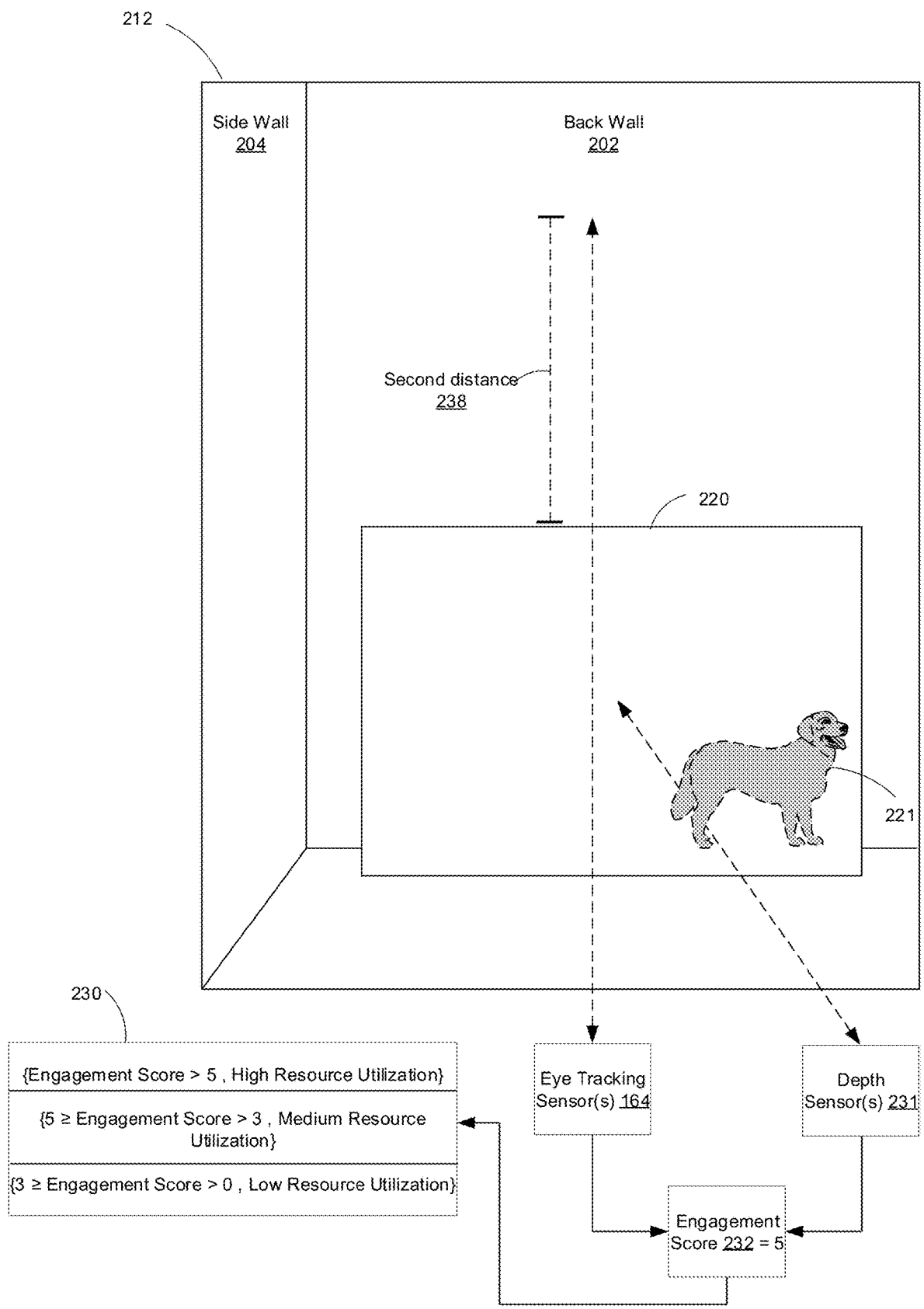

As illustrated in FIG. 2K, the electronic device 210 determines, based on the eye tracking data, that the eye gaze of the user 50 has moved above the display screen 220 and has remained at the second distance 238 from the display screen 220. Moreover, the electronic device 210 determines, based on the depth data, that the distance between the display 212 and the display screen 220 (e.g., the center of the display screen 220) has decreased from the first depth value to a second depth value. The change from the first depth value to the second depth value results from the movement 240 of the electronic device 210 towards the back wall 202. Notably, as compared with FIG. 2G, although the eye gaze remains at the second distance 238 from the display screen 220, the electronic device 210 is closer to the display screen 220 and to the video stream. Thus, in contrast to the relatively low engagement score of '3' described with reference to FIG. 2G, the electronic device 210 determines a medium engagement score of '5,' as illustrated in FIG. 2K. Accordingly, based on the resource mapping table 230, the electronic device 210 changes the utilization of the respective resource from the low resource utilization to the medium resource utilization. Accordingly, the electronic device 210 displays, on the display 212, a fourth portion of the video stream with a medium resolution value (e.g., 1080p). Namely, the dog 221 in FIG. 2K is illustrated with the long dotted lines in order to indicate an increase in resolution, as compared with the short dotted line dog 221 illustrated in FIG. 2G.

Figure 3A:
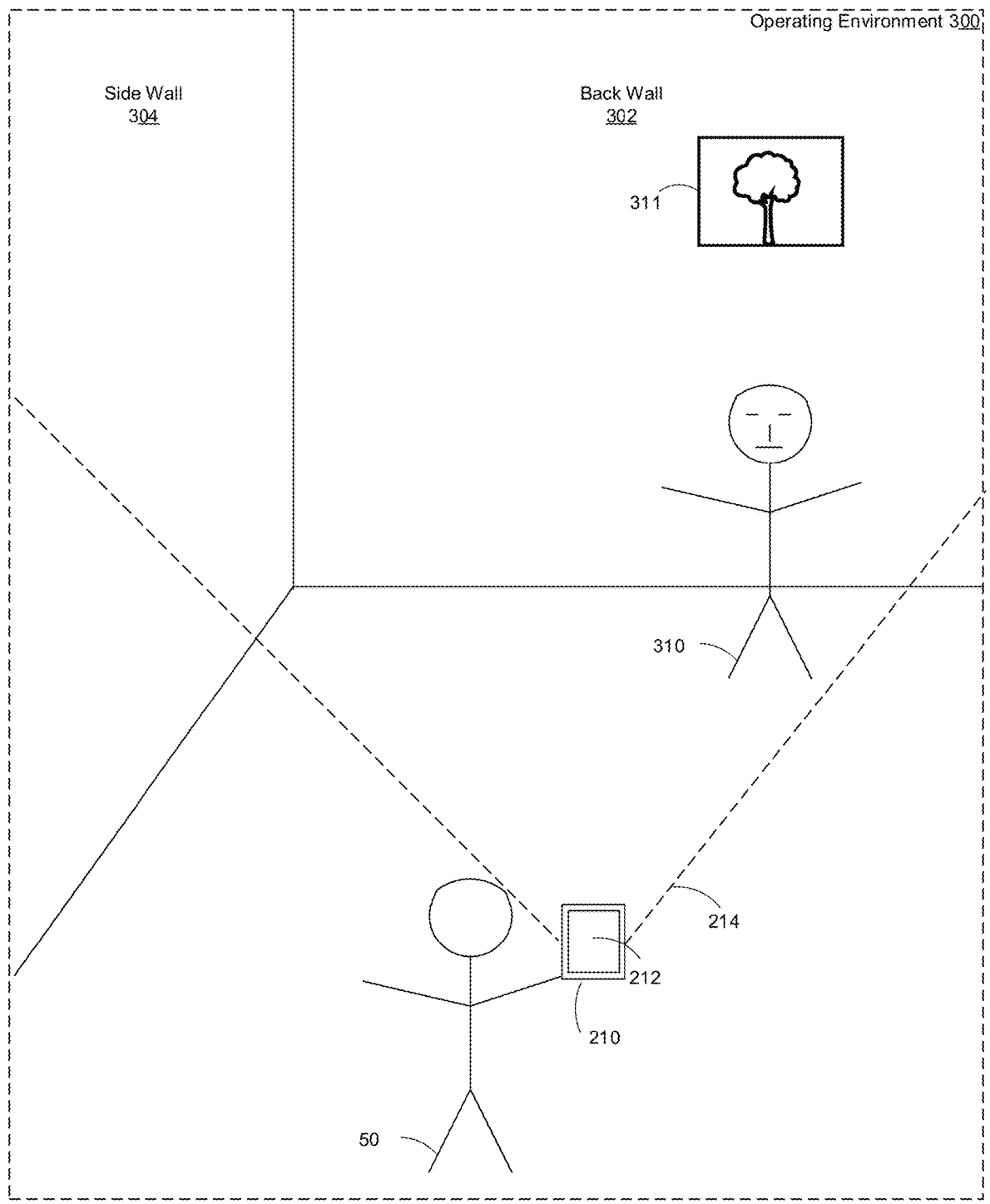
FIGS. 3A-3H are another example of changing resource utilization associated with a media object based on an engagement score in accordance with some implementations.

FIGS. 3A-3H are another example of changing resource utilization associated with a media object based on an engagement score in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. As illustrated in FIG. 3A, the electronic device 210 is associated with an operating environment 300. The operating environment 300 includes a back wall 302, a side wall 304, and a painting 311 that is hanging on the back wall 302. Moreover, the operating environment 300 includes an avatar 310 representing an individual associated with (e.g., currently using) a secondary device. For example, in some implementations, the electronic device 210 and the secondary device are in communication via a copresence session, and the operating environment 300 functions as a shared operating space (e.g., a real or virtual conference room). In some implementations, the electronic device 210 generates the avatar 310. For example, the electronic device 210 obtains, from the secondary device, information characterizing the individual (e.g., height, hair color, etc.), and generates the avatar 310 based on the information.

Figure 3B:
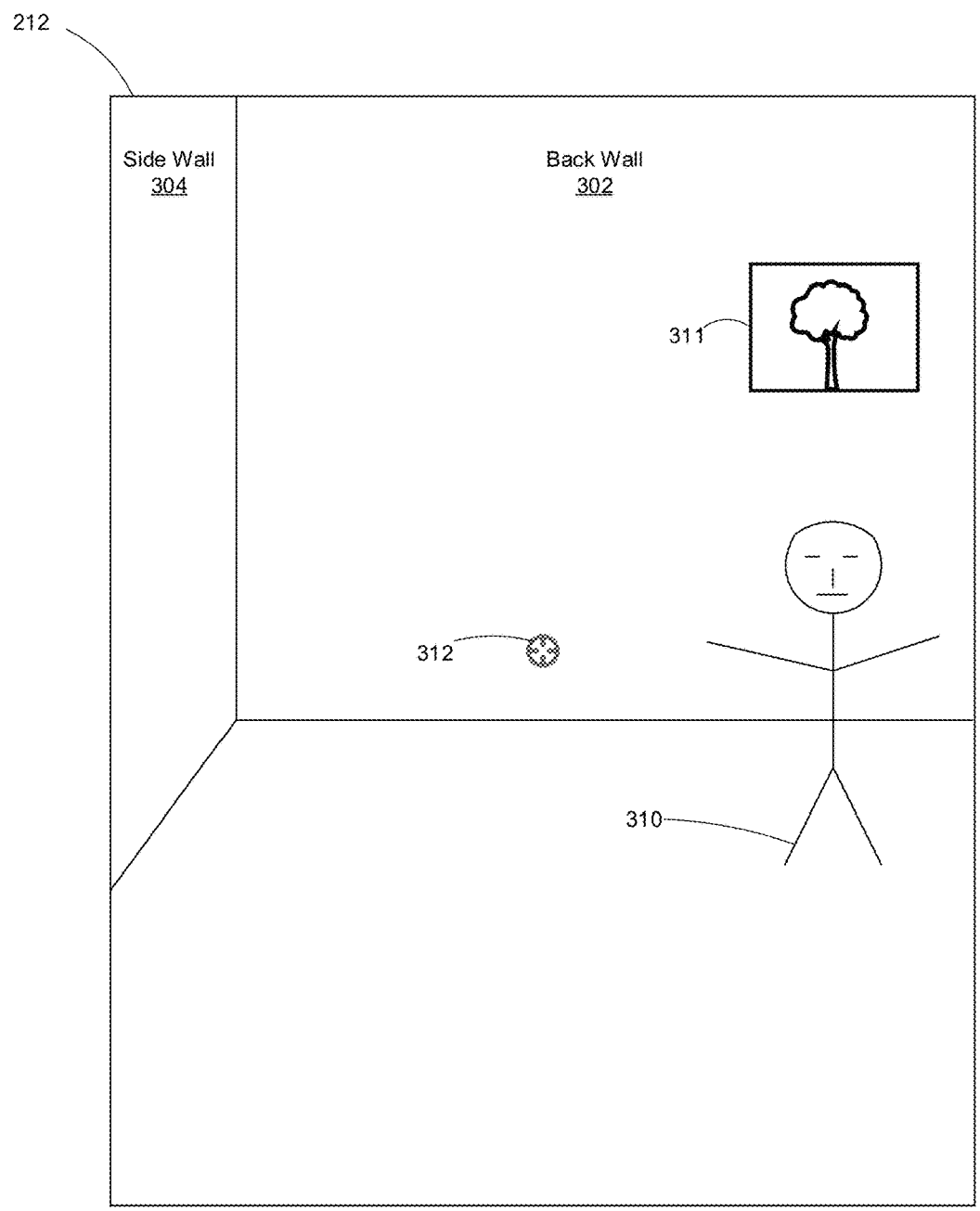

As illustrated in FIG. 3B, the electronic device 210 displays, via the display 212, the back wall 302, the side wall 304, the painting 311, and the avatar 310. The avatar 310 illustrated in FIG. 3B is displayed according to a relatively high utilization of a respective resource, such as a high utilization of a rendering resource (e.g., 4K rendering). Moreover, as is illustrated for purely explanatory purposes, a center point 312 indicates the center point of the display 212. As will be described below, in some implementations, the electronic device 210 determines the engagement score 232 based on a function of the center point 312. One of ordinary skill in the art will appreciate that, in some implementations, the electronic device 210 determines the engagement score 232 based on other factors, such as with respect to an edge or a corner of the display 212.

Figure 3C:
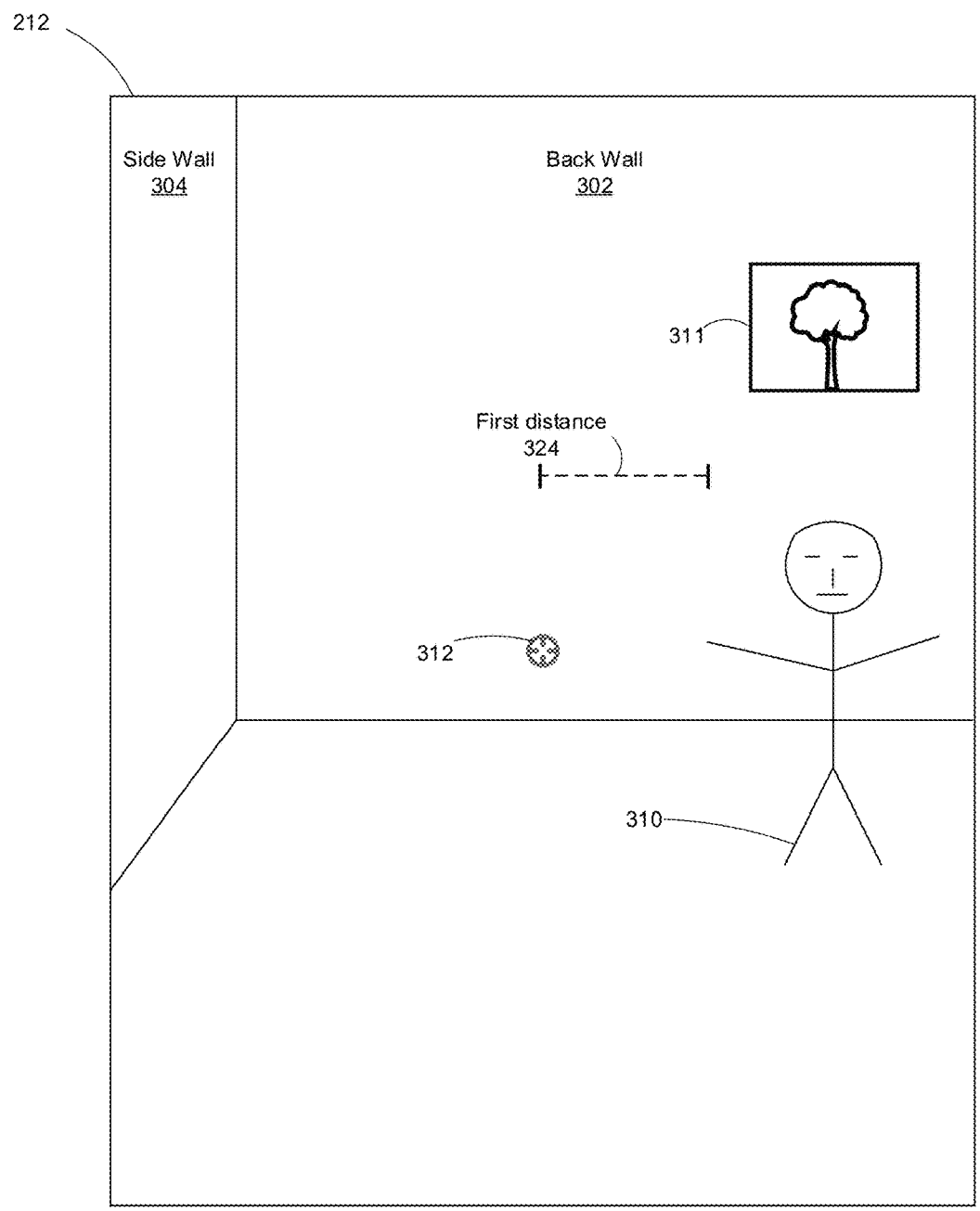
Figure 3D:
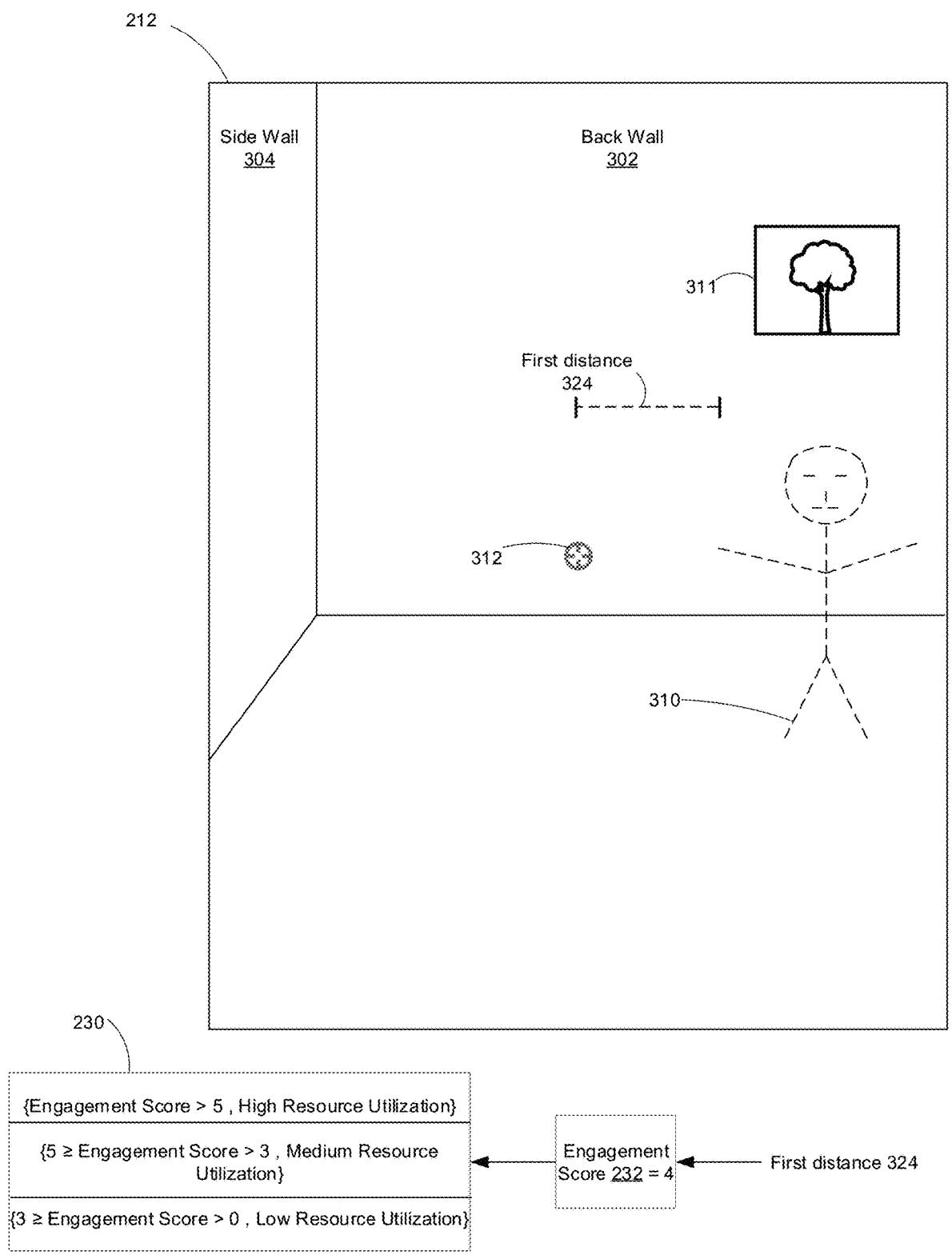

As illustrated in FIG. 3C, the electronic device 210 determines a first distance 324 between the avatar 310 and the center point 312. Accordingly, as illustrated in FIG. 3D, the electronic device 210 determines an engagement score of '4' based on the first distance. Based on the engagement score 232 of '4,' the electronic device 210 sets the utilization of the respective resource to a medium resource utilization, as indicated within the resource mapping table 230 in FIG. 3D. Accordingly, as compared with the solid line avatar 310 illustrated in FIG. 3C, the avatar 310 in FIG. 3D has a dotted line appearance in order to indicate a reduced resolution. The avatar 310 with the reduced resolution is associated with the electronic device 210 utilizing the respective resource according to the medium resource utilization, such as GPU utilization for rendering a medium resolution (e.g., 1080p) or a reduced bandwidth level associated with obtaining (e.g., from the secondary device) a corresponding portion of data that represents the avatar 310.

Figure 3E:
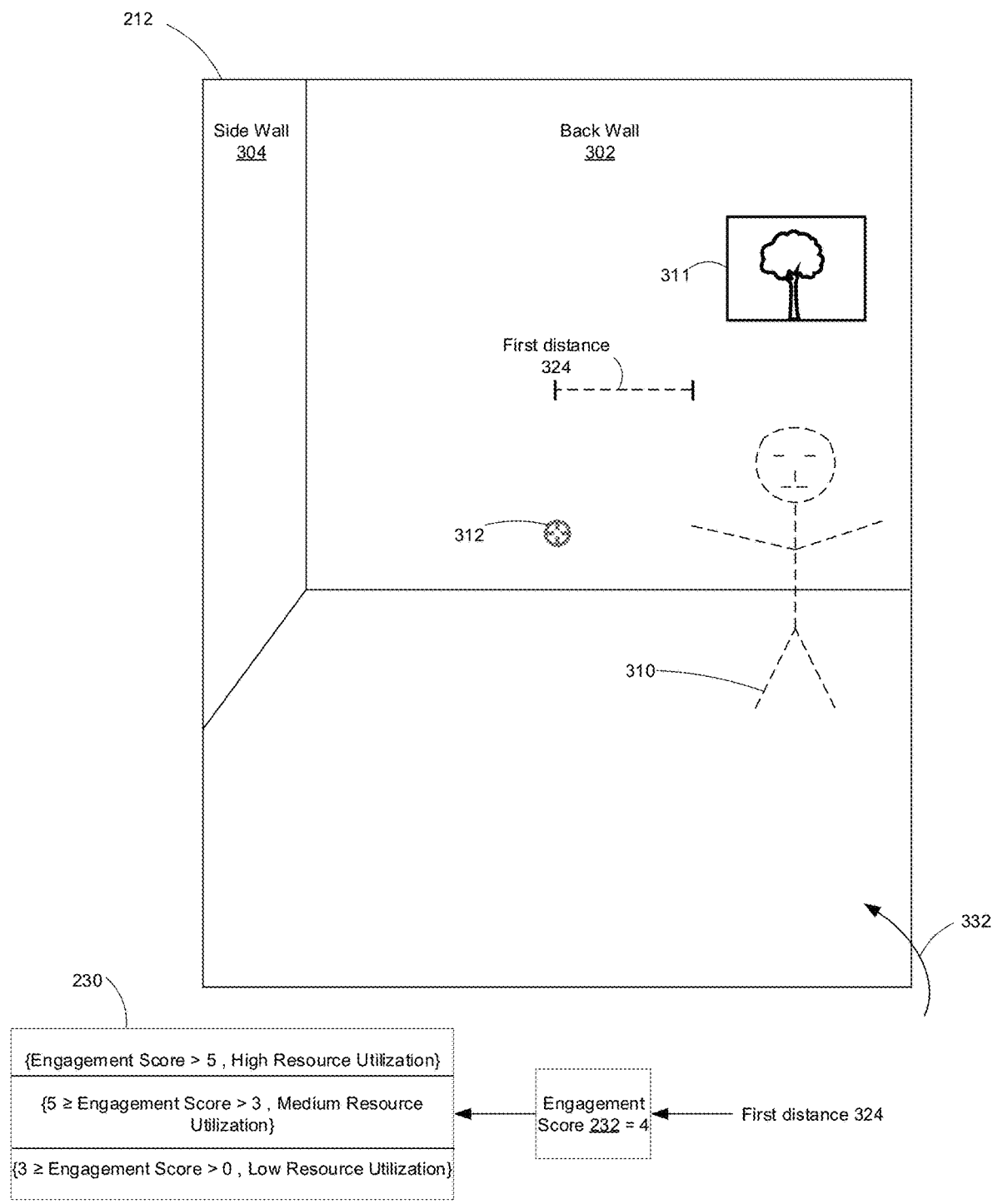

As illustrated in FIG. 3E, the electronic device 210 detects, via one or more input devices (e.g., the IMU 130 in FIG. 1), a first positional change input 332. The first positional change input 332 is indicative of the electronic device 210 changing from a first position to a second position. For example, in some implementations, the first positional change input 332 corresponds to a rotational movement of the electronic device 210 or a translational movement (e.g., along the x-y axis) of the electronic device 210.

Figure 3F:
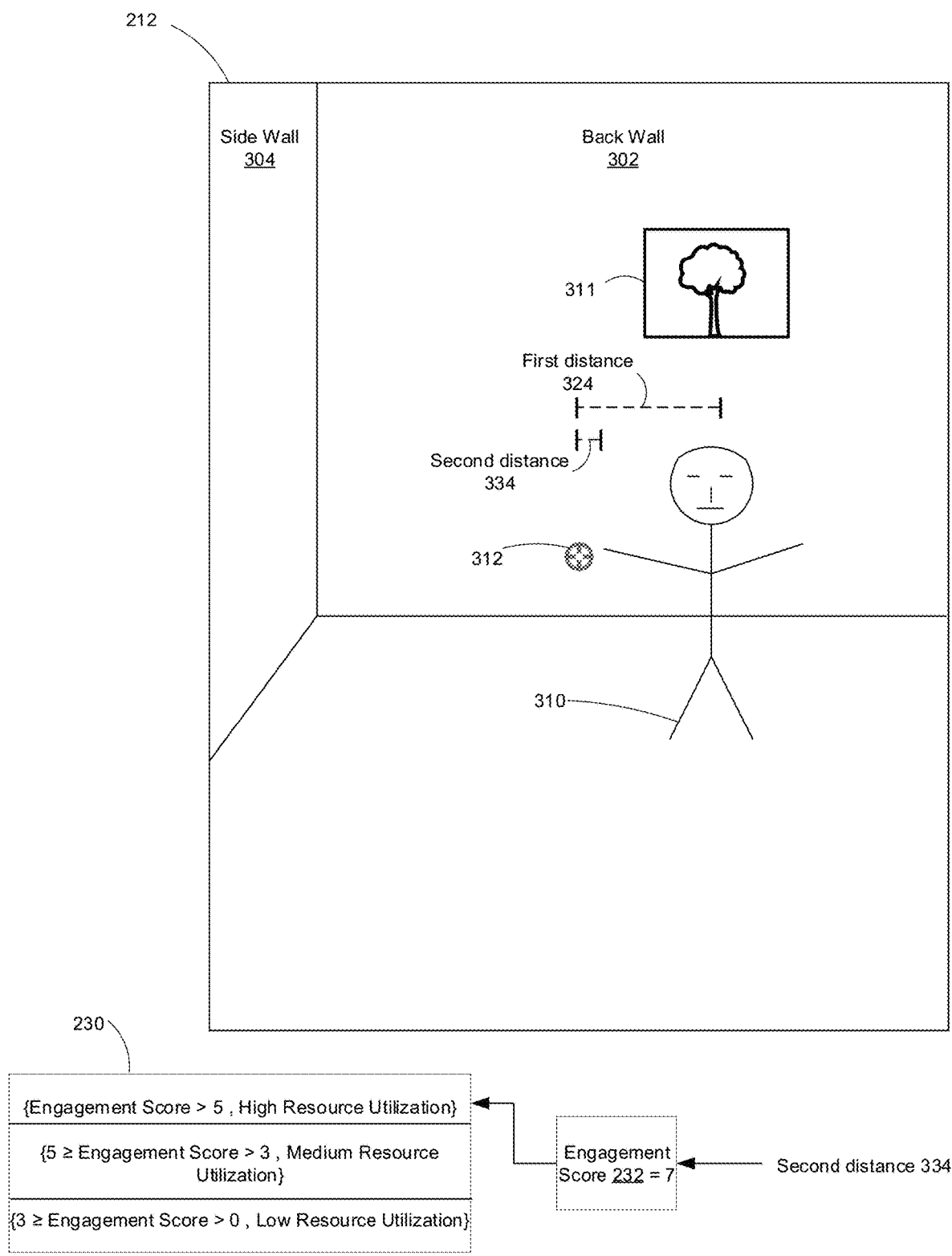

In response to detecting the first positional change input 332 in FIG. 3E, the electronic device 210 correspondingly moves respective locations of the painting 311 and the avatar 310 on the display 212 in FIG. 3F. Accordingly, the avatar 310 is moved to a second distance 334 from the center point 312. The second distance 334 is less than the first distance 324. Moreover, the electronic device 210 changes the engagement score 232 from '4' to '7' because the avatar 310 in FIG. 3F is closer to the center point 312 than the avatar 310 in FIG. 3E. Accordingly, based on increasing the engagement score 232 to '7,' the electronic device 210 increases the utilization of the respective resource from the second value to a third value. Namely, the display 212 displays the avatar 310 in FIG. 3F having a solid line appearance in order to indicate an increased resolution, as compared with the dotted line avatar 310 illustrated in FIG. 3E.

Figure 3G:
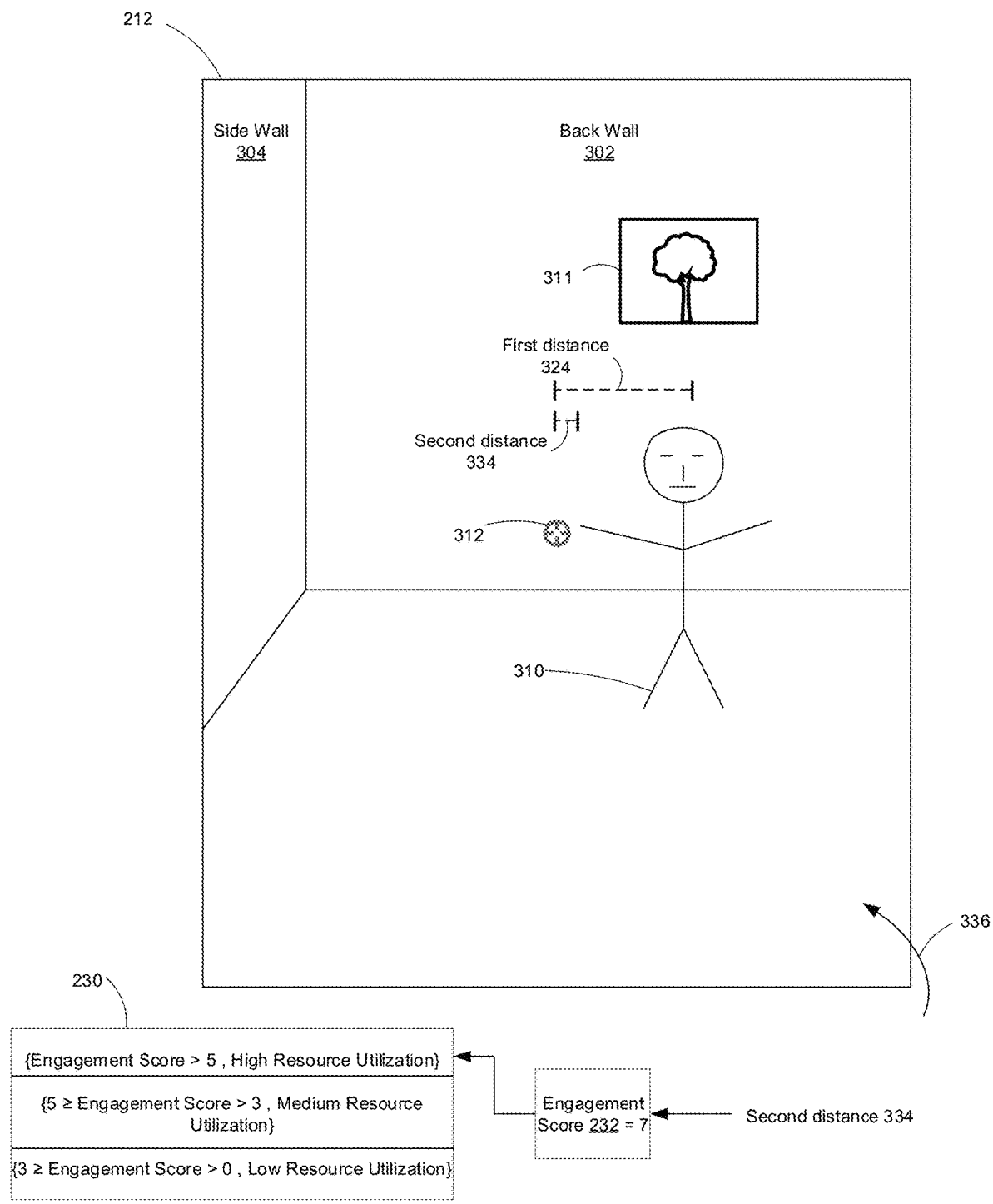
Figure 3H:
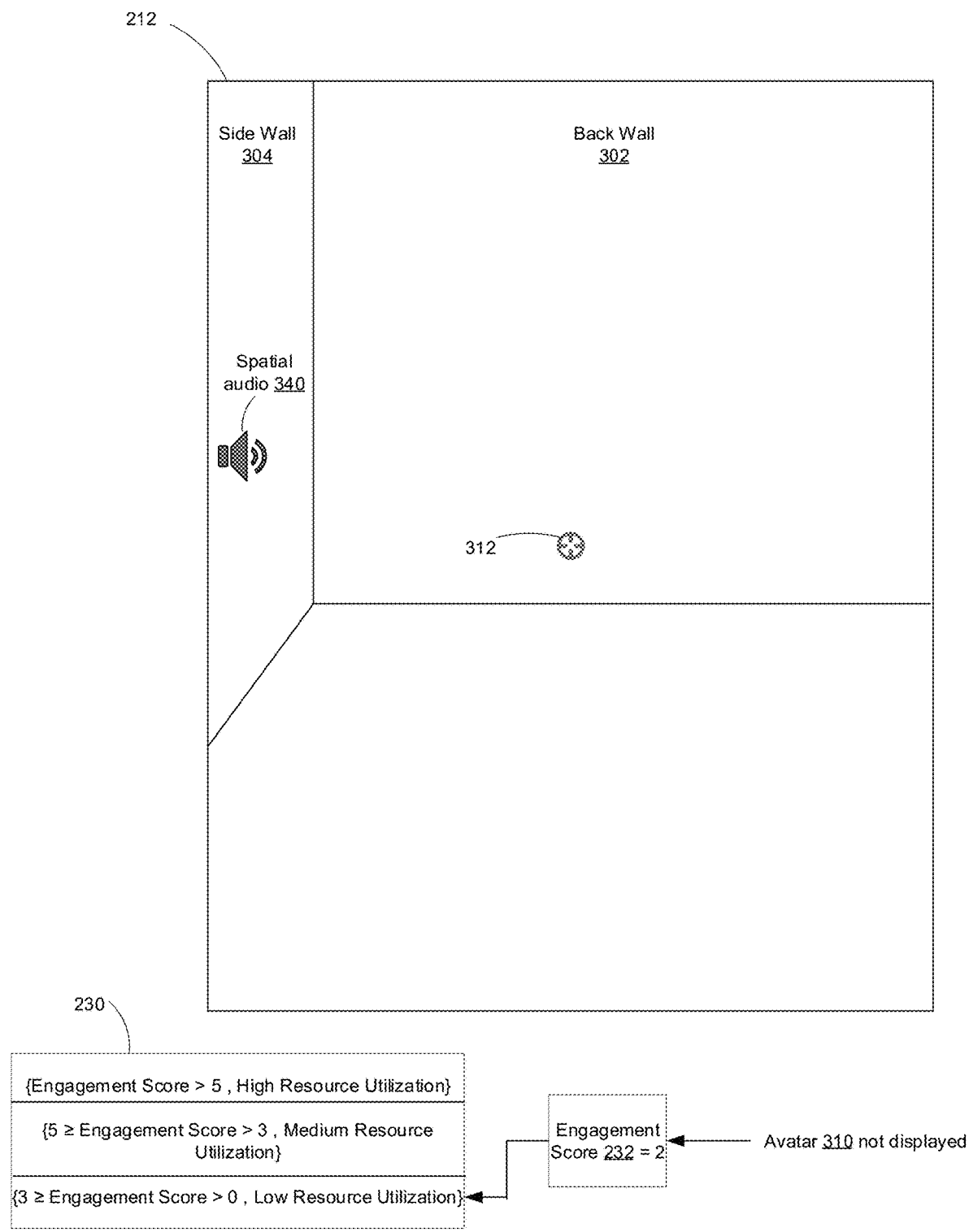

As illustrated in FIG. 3G, the electronic device 210 detects, via the one or more input devices, a second positional change input 336. The second positional change input 336 is indicative of the electronic device 210 changing from the second position to a third position. In response to detecting the second positional change input 336 in FIG. 3G, the electronic device 210 determines that neither the painting 311 nor the avatar 310 are to be displayed on the display 212 and thus ceases to display the painting 311 and the avatar 310. Accordingly, the electronic device 210 reduces the engagement score 232 from '7' to '2' and correspondingly reduces the resource utilization to a low resource utilization, as illustrated in FIG. 3H. In other words, because the avatar 310 is no longer displayed on the display 212, the electronic device 210 need not continue to obtain corresponding displayable data associated with the avatar 310 or render the corresponding displayable data. In some implementations, the low resource utilization corresponds to the electronic device 210 playing spatial audio 340 associated with the avatar 310, as is illustrated in FIG. 3H. The electronic device 210 reduces the utilization of communication link and rendering resources because the spatial audio 340 includes less information than video data, and because the spatial audio 340 need not be rendered. For example, the electronic device 210 plays the spatial audio 340 so as to appear to emanate from the left side of the operating environment 300 because the avatar 310 was moved off of the left side of the display 212 based on the second positional change input 336. Thus, the electronic device 210 provides an undegraded experience to the user 50, while saving resources associated with obtaining and rendering video data associated with the avatar 310. Accordingly, the electronic device 210, as described herein, utilizes less resources than other devices.

Figure 4:
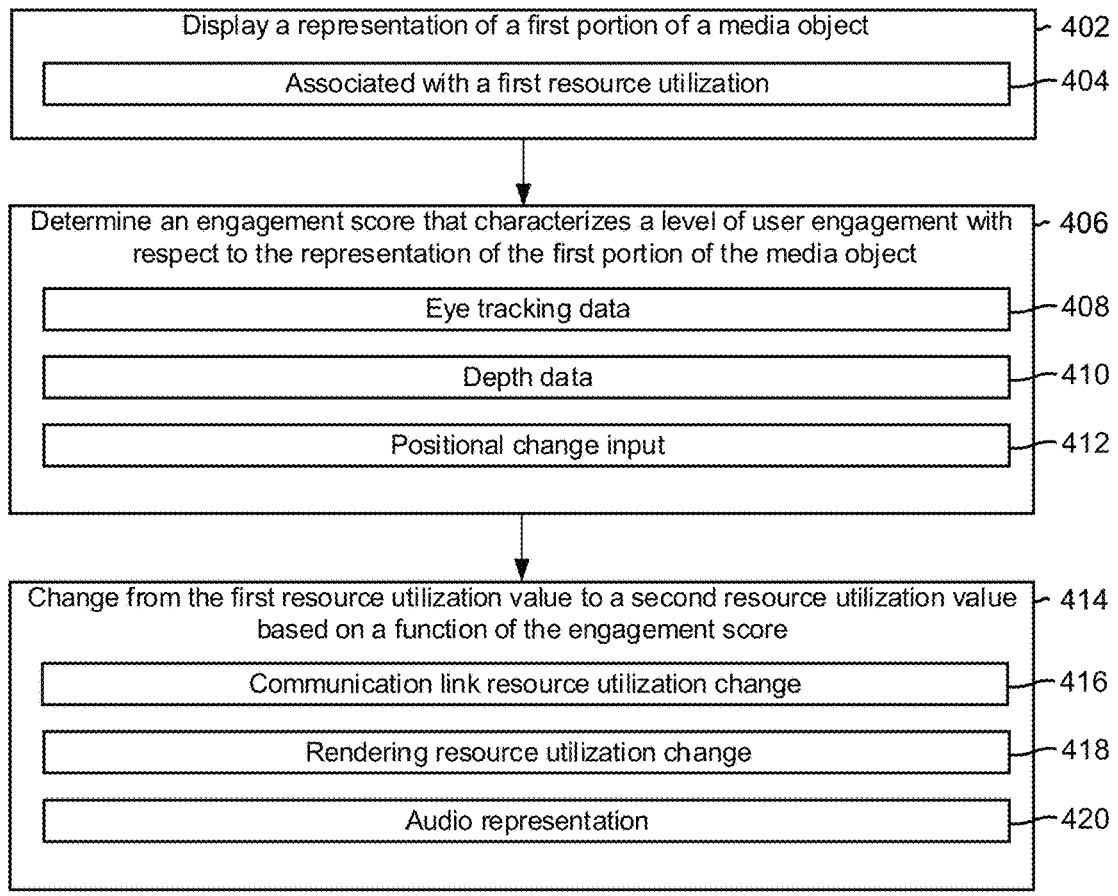
FIG. 4 is an example of a flow diagram of a method of changing resource utilization associated with a media object based on an engagement score in accordance with some implementations.

FIG. 4 is an example of a flow diagram of a method 400 of changing resource utilization associated with a media object based on an engagement score in accordance with some implementations. In various implementations, the method 400 or portions thereof are performed by an electronic device including a display (e.g., the electronic device 100 in FIG. 1 or the electronic device 210 in FIGS. 2A-2K or FIGS. 3A-3H). In various implementations, the method 400 or portions thereof are performed by a head-mountable device (HMD) including an integrated display. In some implementations, the method 400 is performed by processing logic, including hardware, firmware, software, or a combination thereof. In some implementations, the method 400 is performed by a processor executing code stored in a non-transitory computer-readable medium (e.g., a memory). In various implementations, some operations in method 400 are, optionally, combined and/or the order of some operations is, optionally, changed.

As represented by block 402, the method 400 includes displaying, on the display, a representation of a first portion of a media object. For example, with reference to FIG. 2B, the display 212 displays the first portion of the video stream. As represented by block 404, the first portion of the media object is associated with a first resource utilization value, and the first resource utilization value characterizes a utilization of a respective resource by the electronic device. Continuing with the previous example, the first portion of the video stream is associated with a relatively high resource utilization, and thus the electronic device 210 displays the first portion of the video stream at a correspondingly high resolution in FIG. 2B. In some implementations, the media object is a complete episode of a TV show, a complete movie, a complete sequence of moving 3D textures, etc., and the first portion of the media object corresponds to one or more sequential images of the media object. For example, in some implementations, the media object corresponds to the avatar 310 described with reference to FIGS. 3A-3H.

As represented by block 406, the method 400 includes determining an engagement score that characterizes a level of user engagement with respect to the representation of the first portion of the media object. The engagement score characterizes the extent to which a user is focused on the representation of the first portion of the media object, such as for how long a user has been gazing at a video stream.

As represented by block 408, in some implementations, the method 400 includes determining the engagement score based on a function of eye tracking data. To that end, an electronic device includes an eye tracker sensor that provides eye tracking data associated with the user. For example, when the representation of the first portion of the media object is in a periphery of the user, the engagement score is medium to low. As another example, when the representation of the first portion of the media object is within the gaze of the user, the engagement score is higher. As yet another example, in some implementations, the representation of the first portion of the media object is displayed at a first location on the display, and the method 400 includes identifying a gaze position based on a function of the eye tracking data. Continuing with the previous example, in accordance with a determination that the gaze position is less than a threshold distance from the first location, the method 400 includes setting the engagement score to a first value, and in accordance with a determination that the gaze position is not less than the threshold distance from the first location, the method 400 includes setting the engagement score to a second value that is less than first value. As one example, with reference to FIG. 2F, the electronic device 210 sets the engagement score to a value of '5' when the eye gaze of the user (as determined based on eye tracking data) is the first distance 236 from the display screen 220. As another example, with reference to FIG. 2G, the electronic device 210 sets the engagement score to a lower value of '3' when the eye gaze of the user (as determined based on eye tracking data) is a second distance 238 from the display screen 220. The second distance 238 is greater than the first di stance 236.

As represented by block 410, in some implementations, the method 400 includes determining the engagement score based on a function of depth data. To that end, an electronic device includes a depth sensor that provides depth data with respect to the first portion of the media object. For example, with reference to FIGS. 2G and 2K, the electronic device 210 determines the same, second distance 238 between the eye gaze of the user 50 and the display screen 220. However, the electronic device 210 sets the engagement score 232 to '3' in FIG. 2G and to '5' in FIG. 2K because the depth data indicates that the electronic device 210 is farther from the display region 220 in FIG. 2G than in FIG. 2K.

As represented by block 412, in some implementations, the method 400 includes determining the engagement score based on a function of a positional change input. To that end, an electronic device includes one or more input devices (e.g., an IMU, accelerometer, etc.), and the method 400 includes detecting, via the one or more input devices, a positional change input. The positional change input is indicative of the electronic device changing from a first position to a second position. For example, the positional change input corresponds to an HMD moving, such as initiated by a head turn of a wearing the HMD. As one example, in response to detecting the first positional change input 332 in FIG. 3E, the electronic device 210 repositions the avatar 310 closer to the center point 312 of the display 212 in FIG. 3F and accordingly increases the engagement score 232 from '4' to '7.'

In some implementations, in response to detecting the positional change input, in accordance with a determination that the representation of the first portion of the media object is located at a first location on the display that is less than a threshold distance from the center of the display, the method 400 includes setting the engagement score to a first value. Moreover, in accordance with a determination that the representation of the first portion of the media object is located at a second location on the display that is not less than the threshold distance from the center of the display, the method 400 includes setting the engagement score to a second value that is less than the first value. Moreover, in accordance with a determination that the representation of the first portion of the media object is not located on the display, the method 400 includes setting the engagement score to a nominal value. For example, in response to detecting the first positional change input 332 in FIG. 3E, the electronic device 210 repositions the avatar 310 closer to the center point 312 in FIG. 3F and accordingly increases the engagement score 232 from '4' to '7.' On the other hand, in response to detecting the second positional change input 336 in FIG. 3G, the electronic device 210 determines that the avatar 310 is no longer displayed in FIG. 3H and accordingly reduces the engagement score to a nominal value of '2.'

As represented by block 414, the method 400 includes changing the utilization of the respective resource from the first resource utilization value to a second resource utilization value based on a function of the engagement score. The second resource utilization value is associated with a second portion of the media object. The second portion of the media object is different from the first portion of the media object. For example, the first portion of the media object corresponds to a first video frame of a video stream, whereas the second portion of the media object corresponds to a second video frame of the video stream. In some implementations, the method 400 includes registering a change to the engagement score, wherein changing the utilization of the respective resource from the first resource utilization value to the second resource utilization value is in response to determining that the change to the engagement score satisfies a change criterion. As one example, with reference to FIGS. 2F and 2G, in response to determining that the eye gaze is the second distance 238 from the display screen 220 and that the second distance 238 is greater than the first distance 236, the electronic device 210 reduces the engagement score 232 from '5' to '3.' Continuing with this example, the electronic device 210 determines that the change from the engagement score 232 from '5' to '3' satisfies the change criterion, and thus the electronic device 210 correspondingly reduces the resource utilization from the medium resource utilization to the low resource utilization. As another example, when the change to the engagement score corresponds to an increase to the engagement score, the second resource utilization value is higher than the first resource utilization value, and when the change to the engagement score corresponds to a decrease to the engagement score, the second resource utilization value is lower than the first resource utilization value.

As represented by block 416, in some implementations, the respective resource corresponds to a communication link resource. Accordingly, the first resource utilization value characterizes the electronic device obtaining the first portion of the media object, and the second resource utilization value characterizes the electronic device obtaining the second portion of the media object. For example, with reference to FIG. 2E, the electronic device 210 obtains, via a communication link resource, the first portion of the media object at a relatively high download rate in order to display the corresponding first portion of the video stream at a high resolution (e.g., 4K). As another example, with reference to FIG. 2F, the electronic device 210 obtains, via the communication link resource, the second portion of the media object at a medium download rate in order to display the corresponding second portion of the video stream at a medium resolution (e.g., 1080p). In some implementations, the method 400 includes obtaining, according to the first resource utilization value, the first portion of the media object that is provided by a content provisioning system at a first output rate, and obtaining, according to the second resource utilization value, the second portion of the media object that is provided by the content provisioning system at a second output rate that is different from the first output rate.

In some implementations, the content provisioning system is included in the electronic device, such as when the electronic device retrieves the media object from a local non-transitory memory. Accordingly, the communication link resource corresponds to a communication system (e.g., processing resources, memory resources) within the electronic device that facilitates retrieval of the media object from local storage.

In some implementations, the content provisioning system is a content delivery server that is separate from the electronic device, such as a content delivery server that is included in a content delivery network (CDN). For example, the communication link resource corresponds to a network interface, and the electronic device downloads (e.g., streams) the media object via the network interface. For example, in some implementations, the electronic device corresponds to an adaptive bit rate (ABR) enabled device. Continuing the previous example, the electronic device transmits, to the content delivery server, a request for the second portion of the media object in order to change the utilization of the respective resource from the first resource utilization value to the second resource utilization value. As one example, the request corresponds to an HTTP GET command for a specific segment representation of the media object that corresponds to the second portion of the media object. As another example, in some implementations, the specific segment representation is based on various factors including the subscription tier bandwidth allocated to the electronic device and the amount of data currently residing in a playout buffer of the electronic device.

As represented by block 418, in some implementations, the respective resource corresponds to a rendering resource. Accordingly, the first resource utilization value characterizes the electronic device rendering the first portion of the media object, and the second resource utilization value characterizes the electronic device rendering the second portion of the media object. To that end, in some implementations, the method 400 includes rendering, according to the first resource utilization value, the first portion of the media object in order to generate the representation of the first portion of the media object, and rendering, according to the second resource utilization value, the second portion of the media object in order to generate a representation of the second portion of the media object. For example, the electronic device 210 renders a portion of the avatar 310 according to a medium utilization of the rendering resource in order to generate and ultimately display a medium resolution avatar 310 in FIG. 3D. As another example, the electronic device 210 renders a portion of the avatar 310 according to a high utilization of the rendering resource in order to generate and ultimately display a high resolution avatar 310 in FIG. 3E. Accordingly, in some implementations, the representation of the first portion of the media object is characterized by a first video resolution, and the representation of the second portion of the media object is characterized by a second video resolution that is different from the first video resolution. In some implementations, data representing the media object (e.g., a model of the media object) is locally stored in the non-transitory memory of the electronic device, and the electronic device obtains merely positional information characterizing the media object. Thus, the electronic device utilizes a relatively low utilization of a network resource, but may utilize a medium to high utilization of a rendering resource when the media object is to be displayed at a corresponding medium to high resolution.

As represented by block 420, in some implementations, in response to determining that the engagement score falls below a threshold (e.g., is set to a nominal value), the method 400 includes ceasing to display the representation of the first portion of the media object, and playing, via a speaker in the electronic device, an audio representation of the second portion of the media object. The audio representation may correspond to spatial audio that is played based on a function of the engagement score. For example, in response to determining that the avatar 310 is no longer displayed in FIG. 3H, the electronic device 210 sets the engagement score to '2' and accordingly plays the spatial audio 340, without obtaining or rendering video data associated with the avatar 310. Thus, by foregoing obtaining and rendering video in some circumstances, the electronic device 210 reduces overall resource utilization without degrading the user experience.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device with one or more processors, a non-transitory memory, one or more input devices, and a display:
displaying, on the display, a representation of a first portion of a media object, wherein the first portion of the media object is associated with a first resource utilization value, and wherein the first resource utilization value characterizes a utilization of a respective resource by the electronic device;
detecting, via the one or more input devices, a positional change input, wherein the positional change input is indicative of the electronic device changing from a first position to a second position;
in response to detecting the positional change input, determining an engagement score that characterizes a level of user engagement with respect to the representation of the first portion of the media object, wherein:
the engagement score corresponds to a first value according to a determination that the representation of the first portion of the media object is located at a first location on the display that is less than a threshold distance from the center of the display;
the engagement score corresponds to a second value that is less than the first value according to a determination that the representation of the first portion of the media object is located at a second location on the display that is not less than the threshold distance from the center of the display; and
the engagement score corresponds to a nominal value according to a determination that the representation of the first portion of the media object is not located on the display; and
changing the utilization of the respective resource from the first resource utilization value to a second resource utilization value based on the engagement score, wherein the second resource utilization value is associated with a second portion of the media object.

2. The method of claim 1, further comprising:
registering a change to the engagement score, wherein changing the utilization of the respective resource from the first resource utilization value to the second resource utilization value is in response to determining that the change to the engagement score satisfies a change criterion.

3. The method of claim 2, wherein:
when the change to the engagement score corresponds to an increase of the engagement score, the second resource utilization value is higher than the first resource utilization value; and
when the change to the engagement score corresponds to a decrease of the engagement score, the second resource utilization value is lower than the first resource utilization value.

4. The method of claim 1, wherein the respective resource corresponds to a rendering resource, wherein the first resource utilization value characterizes the electronic device rendering the first portion of the media object, and wherein the second resource utilization value characterizes the electronic device rendering the second portion of the media object.

5. The method of claim 4, further comprising:
rendering, according to the first resource utilization value, the first portion of the media object in order to generate the representation of the first portion of the media object; and
rendering, according to the second resource utilization value, the second portion of the media object in order to generate a representation of the second portion of the media object.

6. The method of claim 5, wherein the representation of the first portion of the media object is characterized by a first video resolution, and wherein the representation of the second portion of the media object is characterized by a second video resolution that is different from the first video resolution.

7. The method of claim 1, wherein the respective resource corresponds to a communication link resource, wherein the first resource utilization value characterizes the electronic device obtaining the first portion of the media object, and wherein the second resource utilization value characterizes the electronic device obtaining the second portion of the media object.

8. The method of claim 7, further comprising:
obtaining, according to the first resource utilization value, the first portion of the media object from a content provisioning system at a first output rate; and
obtaining, according to the second resource utilization value, the second portion of the media from the content provisioning system at a second output rate that is different from the first output rate.

9. The method of claim 8, wherein the content provisioning system is integrated in the electronic device.

10. The method of claim 8, wherein the content provisioning system corresponds to a content delivery server that is separate from the electronic device.

11. The method of claim 10, wherein the electronic device corresponds to an adaptive bit rate (ABR) enabled device, and wherein changing the utilization of the respective resource from the first resource utilization value to the second resource utilization value includes transmitting, to the content delivery server, a request for the second portion of the media object.

12. The method of claim 10, wherein the content delivery server is included in a content delivery network (CDN).

13. The method of claim 1, wherein the electronic device includes an eye tracker sensor that provides eye tracking data associated with the user, and wherein determining the engagement score is based on a function of the eye tracking data.

14. The method of claim 13, wherein the representation of the first portion of the media object is displayed at a first location on the display, the method further comprising:
  identifying a gaze position based on a function of the eye tracking data;
  in accordance with a determination that the gaze position is less than a threshold distance from the first location, setting the engagement score to a first value; and
  in accordance with a determination that the gaze position is not less than the threshold distance from the first location, setting the engagement score to a second value that is less than first value.

15. The method of claim 1, wherein the electronic device includes a depth sensor that provides depth data with respect to the first portion of the media object, and wherein determining the engagement score is based on a function of the depth data.

16. The method of claim 1, further comprising:
  in response to determining that the engagement score falls below a threshold:
    ceasing to display the representation of the first portion of the media object; and
    playing, via a speaker integrated in the electronic device, an audio representation of the second portion of the media object, wherein the audio representation corresponds to spatial audio that is played based on a function of the engagement score.

17. An electronic device comprising:
  one or more processors;
  a non-transitory memory;
  one or more input devices;
  a display; and
  one or more programs, wherein the one or more programs are stored in the non-transitory memory and configured to be executed by the one or more processors, the one or more programs including instructions for:
    displaying, on the display, a representation of a first portion of a media object, wherein the first portion of the media object is associated with a first resource utilization value, and wherein the first resource utilization value characterizes a utilization of a respective resource by the electronic device;
    detecting, via the one or more input devices, a positional change input, wherein the positional change input is indicative of the electronic device changing from a first position to a second position;
    in response to detecting the positional change input, determining an engagement score that characterizes a level of user engagement with respect to the representation of the first portion of the media object, wherein:
      the engagement score corresponds to a first value according to a determination that the representation of the first portion of the media object is located at a first location on the display that is less than a threshold distance from the center of the display;
      the engagement score corresponds to a second value that is less than the first value according to a determination that the representation of the first portion of the media object is located at a second location on the display that is not less than the threshold distance from the center of the display; and
      the engagement score corresponds to a nominal value according to a determination that the representation of the first portion of the media object is not located on the display; and
    changing the utilization of the respective resource from the first resource utilization value to a second resource utilization value based on the engagement score, wherein the second resource utilization value is associated with a second portion of the media object.

18. The electronic device of claim 17, wherein the respective resource corresponds to a rendering resource, wherein the first resource utilization value characterizes the electronic device rendering the first portion of the media object, and wherein the second resource utilization value characterizes the electronic device rendering the second portion of the media object.

19. The electronic device of claim 17, wherein the respective resource corresponds to a communication link resource, wherein the first resource utilization value characterizes the electronic device obtaining the first portion of the media object, and wherein the second resource utilization value characterizes the electronic device obtaining the second portion of the media object.

20. The electronic device of claim 17, wherein the electronic device corresponds to an adaptive bit rate (ABR) enabled device, and wherein changing the utilization of the respective resource from the first resource utilization value to the second resource utilization value includes transmitting, to the content delivery server, a request for the second portion of the media object.

21. A non-transitory computer readable storage medium storing one or more programs, the one or more programs comprising instructions, which, when executed by an electronic device with one or more processors, one or more input devices, and a display, cause the electronic device to:
  display, on the display, a representation of a first portion of a media object, wherein the first portion of the media object is associated with a first resource utilization value, and wherein the first resource utilization value characterizes a utilization of a respective resource by the electronic device;
  detect, via the one or more input devices, a positional change input, wherein the positional change input is indicative of the electronic device changing from a first position to a second position;
  in response to detecting the positional change input, determine an engagement score that characterizes a level of user engagement with respect to the representation of the first portion of the media object, wherein:

the engagement score corresponds to a first value according to a determination that the representation of the first portion of the media object is located at a first location on the display that is less than a threshold distance from the center of the display;

the engagement score corresponds to a second value that is less than the first value according to a determination that the representation of the first portion of the media object is located at a second location on the display that is not less than the threshold distance from the center of the display; and the engagement score corresponds to a nominal value according to a determination that the representation of the first portion of the media object is not located on the display; and change the utilization of the respective resource from the first resource utilization value to a second resource utilization value based on the engagement score, wherein the second resource utilization value is associated with a second portion of the media object.

22. The non-transitory computer readable storage medium of claim 21, wherein the respective resource corresponds to a rendering resource, wherein the first resource utilization value characterizes the electronic device rendering the first portion of the media object, and wherein the second resource utilization value characterizes the electronic device rendering the second portion of the media object.

23. The non-transitory computer readable storage medium of claim 21, wherein the respective resource corresponds to a communication link resource, wherein the first resource utilization value characterizes the electronic device obtaining the first portion of the media object, and wherein the second resource utilization value characterizes the electronic device obtaining the second portion of the media object.

24. The non-transitory computer readable storage medium of claim 21, wherein the electronic device corresponds to an adaptive bit rate (ABR) enabled device, and wherein changing the utilization of the respective resource from the first resource utilization value to the second resource utilization value includes transmitting, to the content delivery server, a request for the second portion of the media object.

* * * * *